United States Patent
Kim et al.

(10) Patent No.: US 10,594,455 B2
(45) Date of Patent: Mar. 17, 2020

(54) METHOD FOR TRANSMITTING REFERENCE SIGNAL IN V2X COMMUNICATION AND APPARATUS THEREFOR

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR); Kijun Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/781,419

(22) PCT Filed: Dec. 2, 2016

(86) PCT No.: PCT/KR2016/014119
§ 371 (c)(1),
(2) Date: Jun. 4, 2018

(87) PCT Pub. No.: WO2017/095187
PCT Pub. Date: Jun. 8, 2017

(65) Prior Publication Data
US 2018/0359067 A1  Dec. 13, 2018

Related U.S. Application Data

(60) Provisional application No. 62/262,924, filed on Dec. 4, 2015, provisional application No. 62/269,097, filed on Dec. 18, 2015, provisional application No. 62/295,504, filed on Feb. 16, 2016, provisional application No. 62/373,995, filed on Aug. 12, 2016.

(51) Int. Cl.
*H04L 5/00* (2006.01)
*H04L 27/26* (2006.01)
(Continued)

(52) U.S. Cl.
CPC ........ *H04L 5/0048* (2013.01); *H04L 5/0051* (2013.01); *H04L 27/2607* (2013.01);
(Continued)

(58) Field of Classification Search
CPC . H04L 5/0048; H04L 27/2611; H04L 5/0051; H04L 27/2607; H04W 4/44;
(Continued)

(56) References Cited

U.S. PATENT DOCUMENTS

| | | | |
|---|---|---|---|
| 2012/0014320 A1* | 1/2012 | Nam | H04L 1/1671 370/328 |
| 2013/0294333 A1* | 11/2013 | Chen | H04W 28/06 370/328 |
| 2014/0286255 A1 | 9/2014 | Nam et al. | |
| 2018/0241508 A1* | 8/2018 | Chervyakov | H04L 5/0051 |

OTHER PUBLICATIONS

Intel Corporation, "Demodulation Analysis for V2V Communication," 3GPP TSG RAN WG1 Meeting #83, R1-156538, Anaheim, USA, Nov. 15-22, 2015, pp. 1-9.
(Continued)

*Primary Examiner* — Rina C Pancholi
(74) *Attorney, Agent, or Firm* — Birch, Stewart, Kolasch & Birch, LLP

(57) ABSTRACT

A demodulation reference signal (DMRS) transmission method in a vehicle-to-something (V2X) communication is disclosed. The DMRS in V2X communication is mapped onto four symbols in at least one subframe from among a plurality of subframes. For correction of the frequency offset, the four symbols may comprise a symbol pair located at least two symbol intervals.

14 Claims, 20 Drawing Sheets

(51) Int. Cl.
  *H04W 4/44*    (2018.01)
  *H04W 4/46*    (2018.01)
  *H04W 4/70*    (2018.01)
  *H04W 72/04*   (2009.01)
  *H04W 80/02*   (2009.01)

(52) U.S. Cl.
  CPC ........... *H04L 27/2611* (2013.01); *H04W 4/44* (2018.02); *H04W 4/46* (2018.02); *H04W 4/70* (2018.02); *H04W 72/0446* (2013.01); *H04W 80/02* (2013.01)

(58) Field of Classification Search
  CPC ......... H04W 4/70; H04W 4/46; H04W 80/02; H04W 72/0446
  See application file for complete search history.

(56) References Cited

OTHER PUBLICATIONS

LG Electronics, "Discussion on DMRS Density and Structure to Handle High Doppler Case," 3GPP TSG RAN WG1 Meeting #83, R1-156894, Anaheim, USA, Nov. 15-22, 2015, pp. 1-14.
ZTE, "Discussion on DMRS Enhancement for PC5-Based V2V," 3GPP TSG-RAN WG1 Meeting #83, R1-156660, Anaheim, USA, Nov. 15-22, 2015, 5 pages.

* cited by examiner

FIG. 18

| SF #1 | SF #2 | SF #3 | SF #4 |

FIG. 19a

| 0 | 1 | 2 | 3 | 4 | 5 | 6 | 7 | 8 | 9 | 10 | 11 | 12 | 13 | 14 | 15 | 16 | 17 | 18 | 19 |

Group 1    Group 2    Group 3    Group 4    Group 5

FIG. 19b

| 0 | 1 | 2 | 3 | 4 | 5 | 6 | 7 | 8 | 9 | 10 | 11 | 12 | 13 | 14 | 15 | 16 | 17 | 18 | 19 |

METHOD FOR TRANSMITTING REFERENCE SIGNAL IN V2X COMMUNICATION AND APPARATUS THEREFOR

CROSS REFERENCE TO RELATED APPLICATIONS

This application is the National Phase of PCT International Application No. PCT/KR2016/014119, filed on Dec. 2, 2016, which claims priority under 35 U.S.C. 119(e) to U.S. Provisional Application No. 62/262,924, filed on Dec. 4, 2015, U.S. Provisional Application No. 62/269,097, filed on Dec. 18, 2015, U.S. Provisional Application No. 62/295,504, filed on Feb. 16, 2016, and U.S. Provisional Application No. 62/373,995, filed on Aug. 12, 2016, all of which are hereby expressly incorporated by reference into the present application.

TECHNICAL FIELD

The present invention relates to a wireless communication system, and more particularly, to a method for transmitting a reference signal in vehicle-to-something (V2X) communication and apparatus therefor.

BACKGROUND ART

According to intelligent transportation systems (ITS), many ongoing efforts are made to research and develop methods for exchanging various informations such as real-time traffic information and/or safety warning between vehicles. For example, ongoing efforts are made to research and develop vehicle communications for a proximity service (ProSe) and a public warning system. A communication interface for a vehicle can be commonly called V2X (vehicle-to-x). V2X communication may be categorized into V2V (vehicle-to-vehicle) communication, V2P (vehicle-to-pedestrian) communication, and V2I (vehicle-to-infrastructure entity) communication. V2V communication may refer to communication between vehicles. V2P communication may refer to communication between a vehicle and a personally carried device (e.g., a handheld terminal of a pedestrian or a bicycle rider). And, V2I communication may refer to communication between a vehicle and a roadside unit (RSU). RSU may refer to a traffic infrastructure entity. For example, RSU may include an entity that transmits a speed notification. For V2X communication, a vehicle, an RSU and a handheld device may be equipped with a transceiver.

As describe above, V2X communication may be used to indicate warnings for various events such as safety and the like. For example, information on an event occurring on a vehicle or road may be notified to another vehicle or pedestrians through V2X communication. For example, information on a warning of a traffic accident, a road situation change, or an accident danger may be forwarded to another vehicle or pedestrian. For example, a pedestrian, who is adjacent to or crossing a road, can be informed of information on vehicle approach.

However, since a vehicle moves at higher speed than a pedestrian, the V2X communication may have relatively low reliability. For example, a phase may be sharply changed due to the Doppler effect. In addition, a channel state may also be changed rapidly due to vehicle movement. Hence, to cope with the rapidly changed channel state, a method capable of achieving high reliability of communication is required.

The present invention is proposed to solve the above-described problems, and particularly, the invention discloses a method for ensuring stable communication in various types of communication including V2X communication.

DISCLOSURE OF THE INVENTION

Technical Task

The technical task of the present invention is to provide a method for transmitting a reference signal in V2X communication and apparatus therefor.

Technical Solutions

To achieve these objects and other advantages, in an aspect of the present invention, provided herein is a method for transmitting a demodulation reference signal (DMRS) in vehicle-to-something (V2X) communication by a user equipment (UE), including: mapping the DMRS based on a first mapping rule in one or more subframes among a plurality of subframes; mapping the DMRS based on a second mapping rule different from first mapping rule in remaining subframes except the one or more subframes among the plurality of subframes; and transmitting a message in the plurality of subframes. In this case, according to the first mapping rule, the DMRS may be mapped to four first symbols in one subframe, and the first symbols may include at least one symbol pair with a two-symbol interval or shorter.

Preferably, according to the second mapping rule, the DMRS may be mapped to two second symbols in one subframe.

Preferably, according to the second mapping rule, the DMRS may be mapped to four second symbols in one subframe, and an interval between second symbols may be longer than two symbols.

Preferably, the one or more subframes may include the first subframe and the last subframe among the plurality of subframes.

Preferably, the one or more subframes may include a subframe located at a center among the plurality of subframes.

Preferably, the plurality of subframes may be used to transmit a periodic message, and the one or more subframes may include subframes corresponding to multiples of a transmission period of the periodic message.

Preferably, an interval between two adjacent symbols among the four first symbols may be equal to or shorter than a predetermined interval, an orthogonal cover code may be applied to the two adjacent symbols.

In another aspect of the present invention, provided herein is a user equipment (UE) for transmitting a demodulation reference signal (DMRS) in vehicle-to-something (V2X) communication, including: a transceiver; and a processor configured to control the transceiver. In this case, the processor may be configured to: map the DMRS based on a first mapping rule in one or more subframes among a plurality of subframes; map the DMRS based on a second mapping rule different from first mapping rule in remaining subframes except the one or more subframes among the plurality of subframes; and transmit a message in the plurality of subframes. In addition, according to the first mapping rule, the DMRS may be mapped to four first symbols in one subframe, and the first symbols may include at least one symbol pair with a two-symbol interval or shorter.

Advantageous Effects

According to embodiments of the present invention, it is possible to improve a frequency offset correction method and channel estimation performance in V2X communication.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 18 illustrates a subframe configuration for explaining a DMRS mapping method.

FIG. 19a illustrates subframe groups according to an embodiment.

FIG. 19b illustrates subframe groups according to another embodiment.

BEST MODE FOR INVENTION

Figure 1:
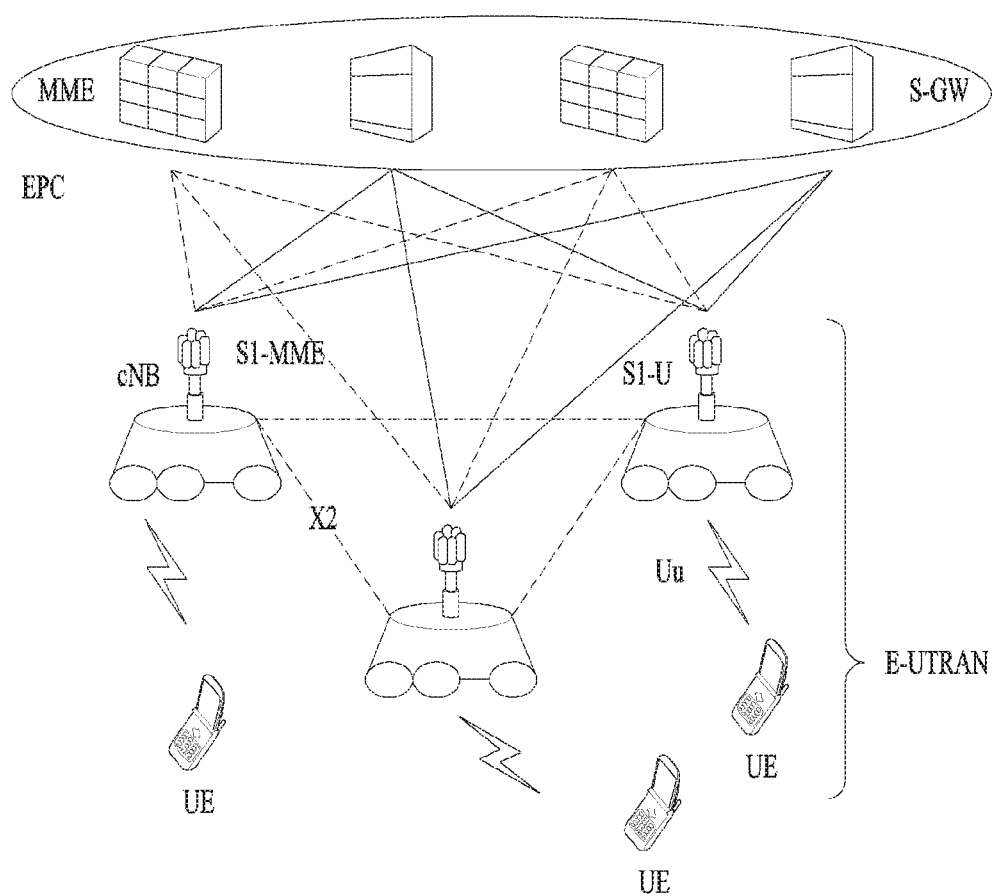
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described, focusing on a data transmission and reception relationship between vehicles. In the following description, a vehicle means the vehicle which a terminal is mounted on, and it may be called a terminal. In addition, a road side unit may mean an infrastructure capable of connecting to a base station, relay or network. In this case, the base station may serve as a terminal node of the network over which the base station directly communicates with the terminal. Moreover, specific operations illustrated as being conducted by the base station may also be conducted by an upper node of the base station. Further, a pedestrian may mean the person moving on bicycle or the person carrying a terminal.

It will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000.

The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
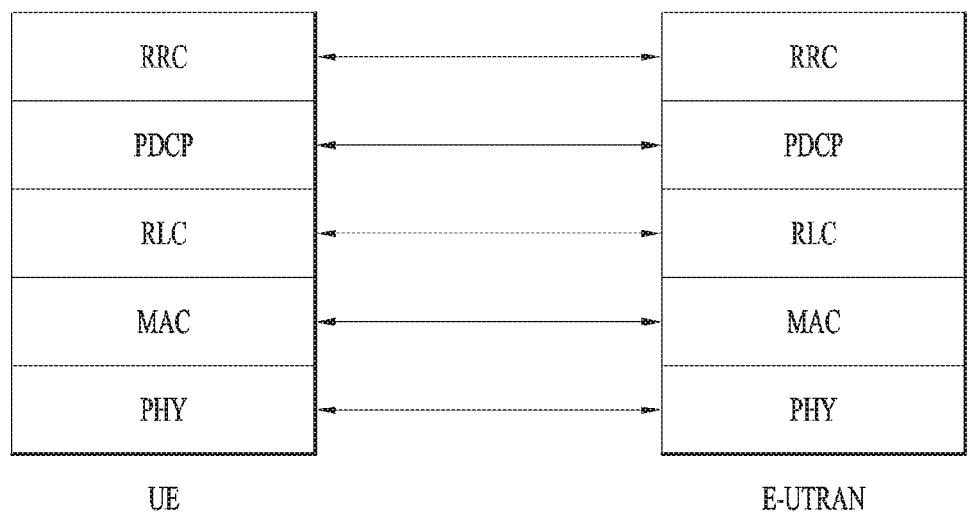
FIG. 2 illustrates a control plane of a radio protocol.
Figure 3:
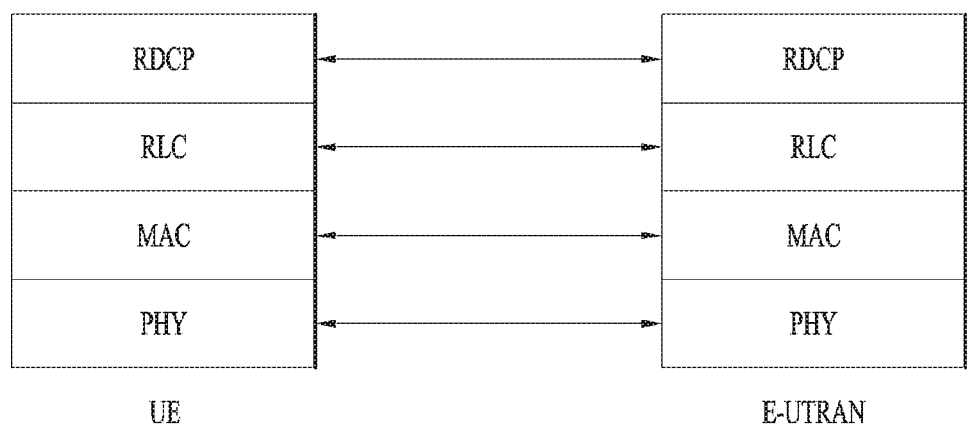
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
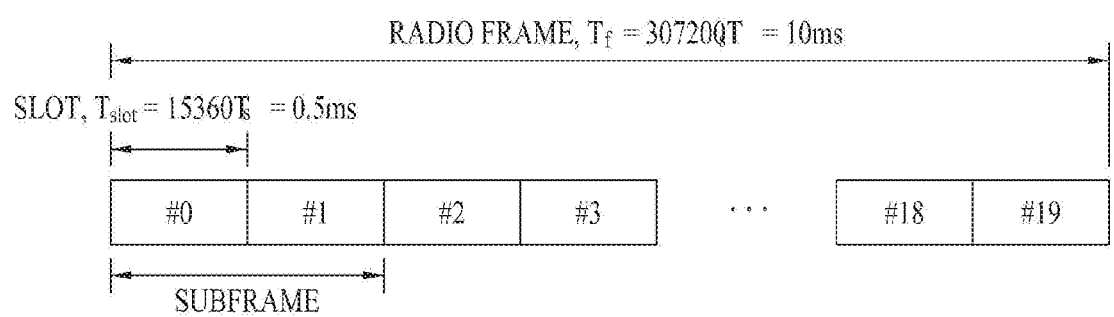
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
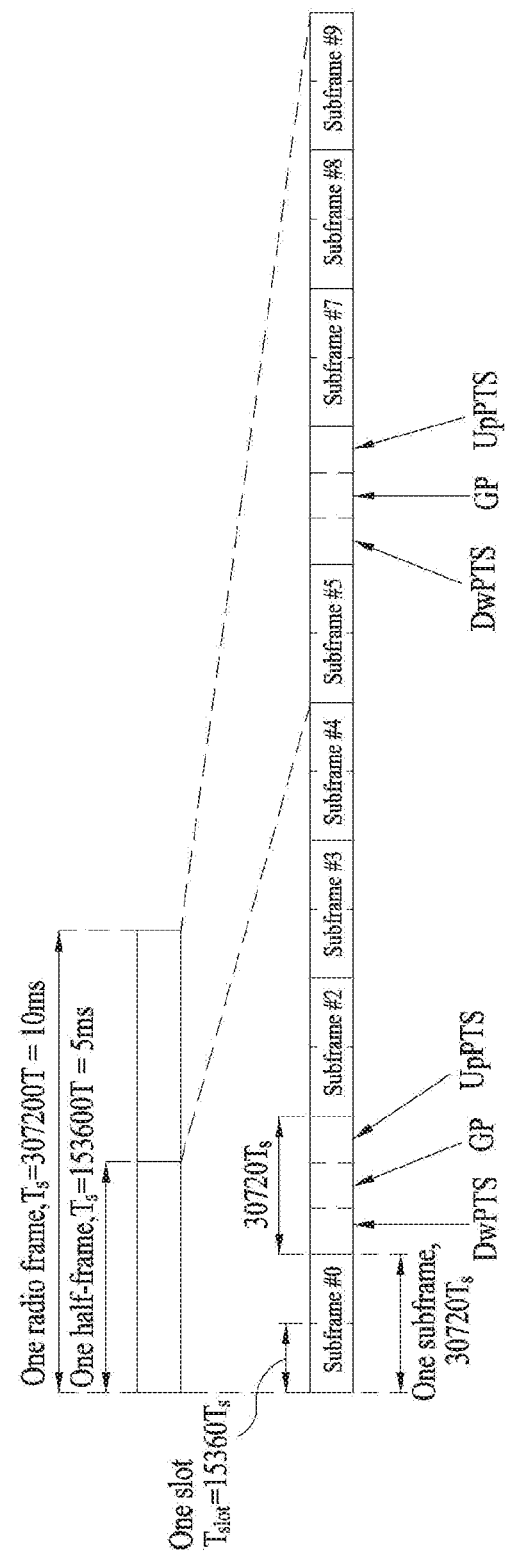
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
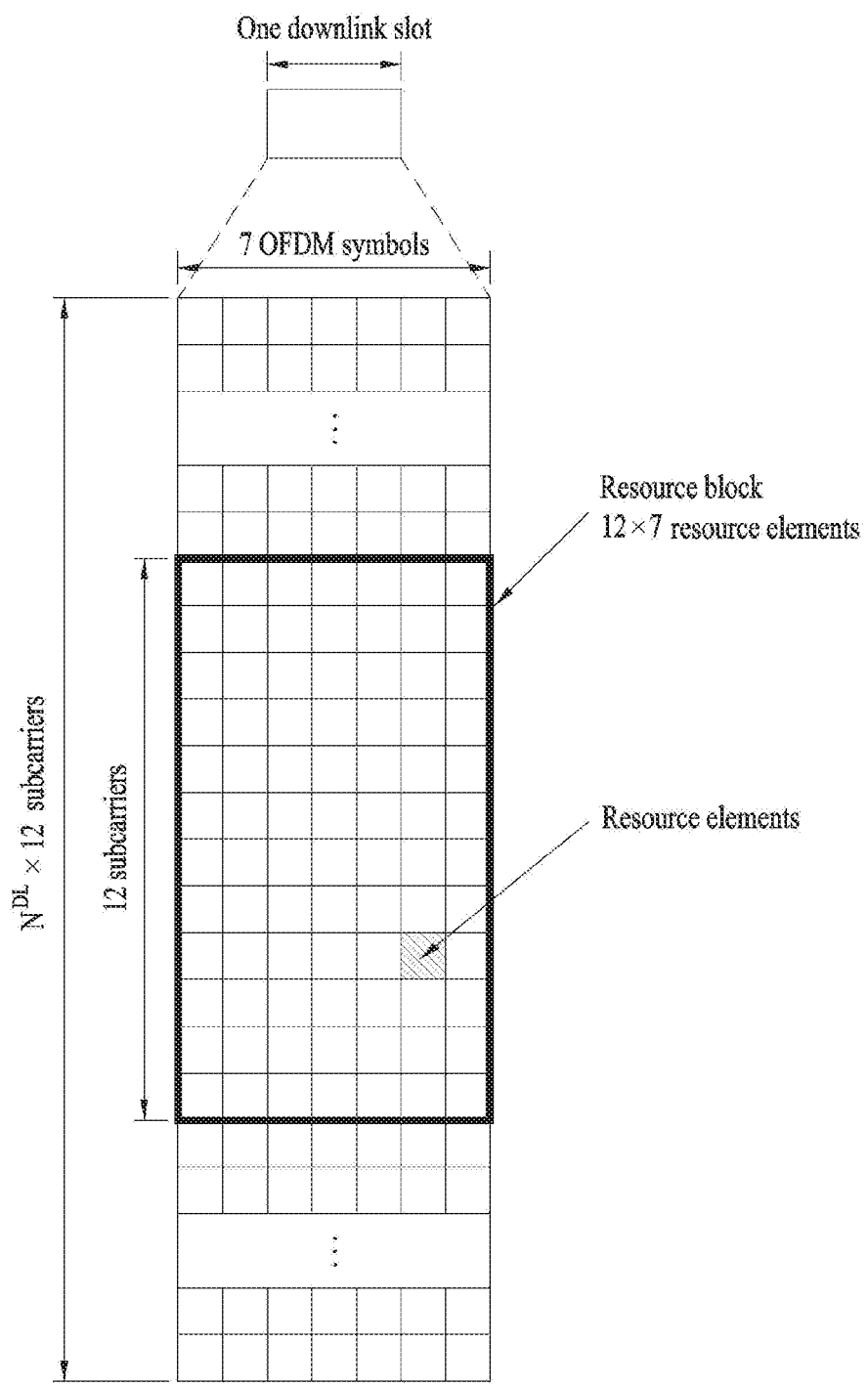
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
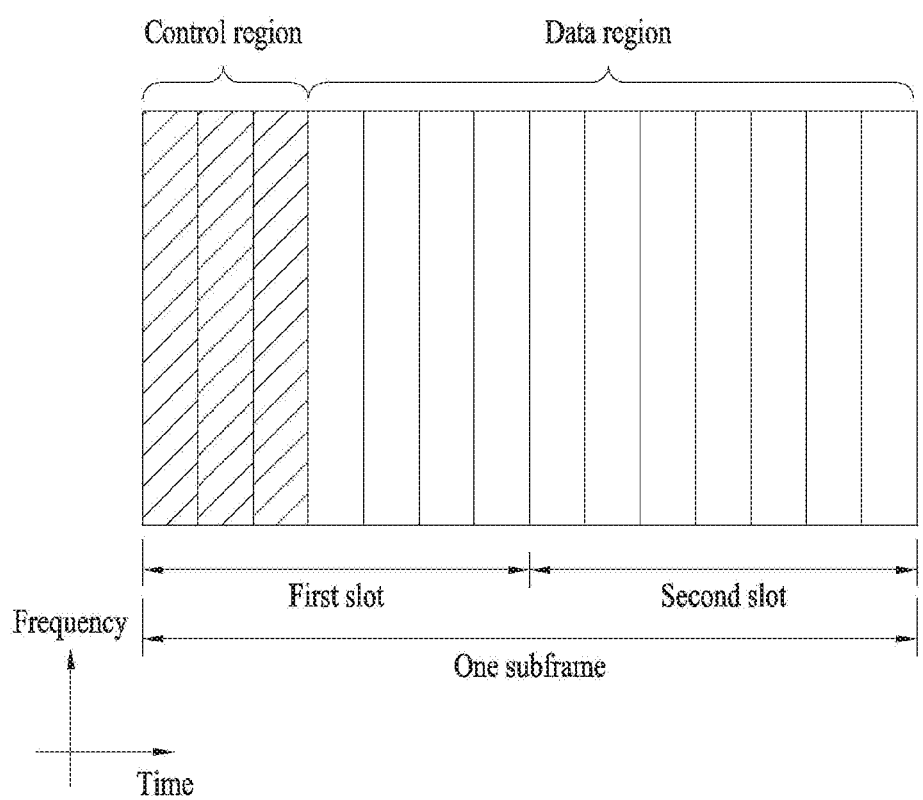
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
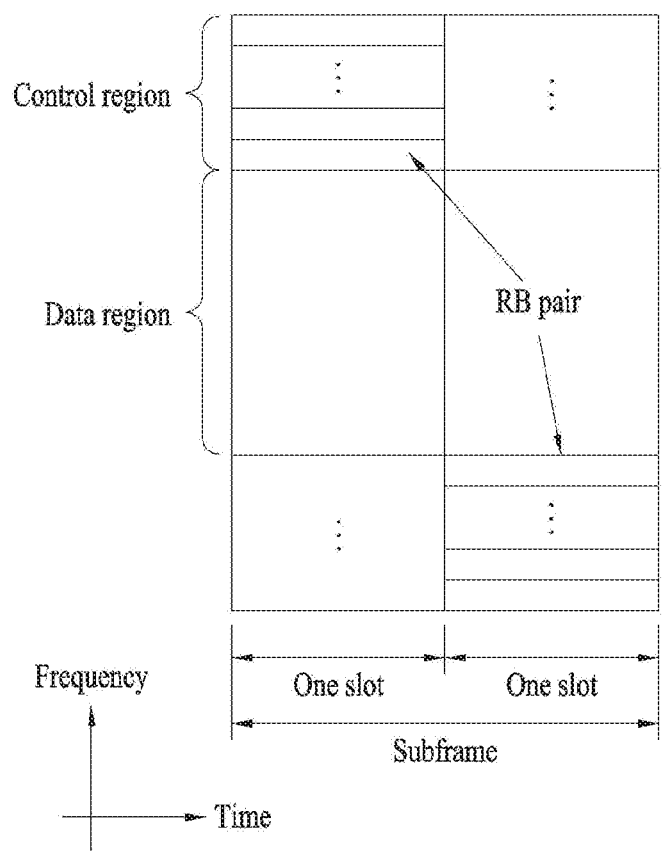
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

In the following, various embodiments for a UE to perform device to device communication (hereinafter, D2D communication, D2D direct communication, etc.) are explained. In explaining the D2D communication, 3GPP LTE/LTE-A is mainly explained as an example. Yet, the D2D communication can also be applied to a different communication system (e.g., IEEE 802.16, WiMAX, etc.).

D2D Communication Type

D2D communication can be classified into a network coordinated D2D communication type and an autonomous D2D communication type according to whether a D2D communication is performed by a control of a network. The network coordinated D2D communication type can be classified again into a type of transmitting data only by D2D (data only in D2D) and a type of performing an access control only by a network (connection control only in network) according to the extent of involvement of the network. For clarity, the type of transmitting data only by the D2D is called a 'network concentrated D2D communication type' and the type of performing access control only by the network is called a 'distributed D2D communication type' in the following.

According to the network concentrated D2D communication type, data is exchanged between D2D terminals only. An access control (connection control) and radio resource allocation (grant message) between the D2D terminals are performed by a network. The D2D terminals can transmit and receive data or specific control information using a radio resource allocated by the network. For instance, HARQ ACK/NACK feedback for the data reception between the D2D terminals or channel state information (CSI) is not directly exchanged between the D2D terminals. Instead, the feedback or the CSI can be transmitted to a different D2D terminal via the network. Specifically, when the network establishes a D2D link between the D2D terminals and allocates a radio resource to the established D2D link, a transmission D2D terminal and a reception D2D terminal can perform D2D communication using the allocated radio resource. In particular, according to the network concentrated D2D communication type, D2D communication between D2D terminals is controlled by the network and the D2D terminals can perform D2D communication using a radio resource allocated by the network.

A network according to the distributed D2D communication type performs a more limitative role compared to a network according to the network concentrated D2D communication type. Although the network in the distributed D2D communication type performs an access control between D2D terminals, radio resource allocation (grant message) between the D2D terminals can be autonomously occupied by the D2D terminals via contention without a help of the network. For instance, HARQ ACK/NACK feedback for the reception of data between the D2D terminals or channel state information can be directly exchanged between the D2D terminals without passing through the network.

As mentioned earlier in the foregoing example, D2D communication can be classified into the network concentrated D2D communication type and the distributed D2D communication type according to the extent of involvement of a network. In this case, a common characteristic between the network concentrated D2D communication type and the distributed D2D communication type is a D2D access control capable of being performed by the network.

Specifically, a network according to the network coordinated D2D communication type can establish a connection between D2D terminals in a manner of establishing a D2D link between the D2D terminals intending to perform D2D communication. In case of establishing the D2D link between the D2D terminals, the network can assign a physical D2D link identifier (LID) to the established D2D link. The physical D2D link ID can be used as an identifier for identifying each of a plurality of D2D links in case that there are a plurality of the D2D links among a plurality of D2D terminals.

Unlike the network concentrated type and the distributed D2D communication type, according to an autonomous D2D communication type, D2D terminals can freely perform D2D communication without a help of a network. In particular, unlike the network concentrated type and the distributed D2D communication type, an access control, occupation of a radio resource and the like can be autonomously performed by the D2D terminals in the autonomous D2D communication type. If necessary, the network may provide the D2D terminals with D2D channel information capable of being used in a corresponding cell.

Configuration of D2D Communication Link

For clarity, a terminal performing or capable of performing the D2D communication, which is a direct communication between terminals, is called a D2D terminal (D2D terminal). In the following description, a WE' may correspond to a D2D terminal. When it is necessary to distinguish a transmitting end from a receiving end, in case of performing the D2D communication, a D2D terminal transmitting or intending to transmit data to a different D2D terminal using a radio resource given to a D2D link is called a transmission D2D terminal. On the contrary, a terminal receiving or intending to receive data from the transmission D2D terminal is called a reception D2D terminal. If there exist a plurality of reception D2D terminals, which receive or intend to receive data from the transmission D2D terminal, a plurality of the reception D2D terminals can be distinguished from each other using a prefix such as 'first to N'. Moreover, for clarity, such a random node of a network as a base station configured to perform access control between D2D terminals or allocate a radio resource to a D2D link, a D2D server, an access/session management server and the like are commonly called a 'network' in the following description.

In order for a D2D terminal performing D2D communication to transmit data to a different D2D terminal via the D2D communication, it is necessary for the D2D to check whether or not D2D terminals capable of transmitting and receiving data are located near the D2D terminal. To this end, the D2D terminal performs D2D peer discovery. The D2D terminal performs D2D discovery within a discovery interval and all D2D terminals may share the discovery interval. The D2D terminal monitors logical channels of a discovery region within the discovery interval to receive D2D discovery signals transmitted by different D2D terminals. Having received the signals of the different D2D terminals, the D2D terminal makes a list of adjacent D2D terminals using the received signal. And, the D2D terminal broadcasts information (i.e., an identifier) of the D2D terminal within the discovery interval and the different D2D terminals receive the broadcasted D2D discovery signal. By doing so, the different D2D terminals are able to know that the D2D terminal exists within a range capable of performing D2D communication.

Information broadcasting for D2D discovery can be periodically performed. And, broadcasting timing can be determined in advance by a protocol and can be notified to D2D terminals. The D2D terminal can transmit/broadcast a signal during a part of the discovery interval. Each of the D2D terminals may monitor signals potentially transmitted by different D2D terminals during the rest of the D2D discovery interval.

For example, a D2D discovery signal may correspond to a beacon signal. And, D2D discovery intervals may include a plurality of symbols (e.g., OFDM symbols). A D2D terminal selects at least one symbol belonging to a D2D discovery interval to transmit/broadcast a D2D discovery signal. And, the D2D terminal may transmit a signal corresponding to a tone of the symbol selected by the D2D terminal.

After D2D UEs discovers each other through a D2D discovery process, the D2D UEs perform a connection establishment process. By doing so, one D2D UE can transmit traffic to the other D2D UE.

Figure 9:
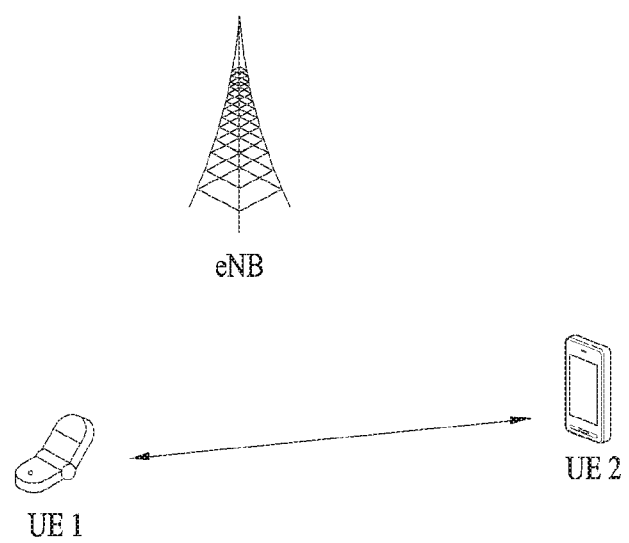
FIG. 9 is a diagram for a simplified D2D communication network.

FIG. 9 is a diagram for a simplified D2D communication network.

Referring to FIG. 9, D2D communication is performed between UEs (UE1 and UE2) supporting D2D communication. In general, a user equipment (UE) corresponds to a terminal of a user. If such a network device as an eNB (evolved Node B) transmits and receives a signal according to a communication scheme between the UEs UE1 and UE2), the eNB can be considered as a UE as well.

A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 10:
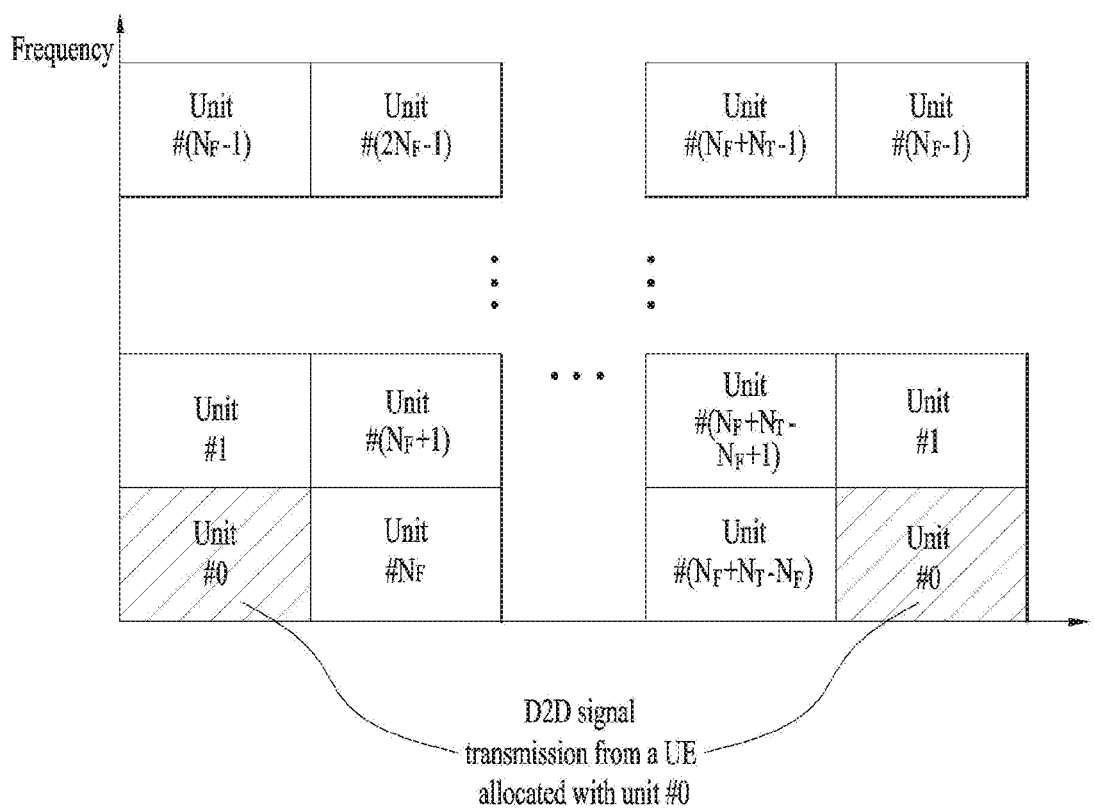
FIG. 10 is a diagram for a configuration of a resource unit according to an example.

FIG. 10 is a diagram for a configuration of a resource unit according to an example.

In FIG. 10, a vertical axis corresponds to a frequency resource and a horizontal axis corresponds to a time resource. A radio resource is divided into the $N_T$ number of resource units in a time axis to configure the $N_T$ number of subframes. And, a frequency resource is divided into the $N_F$ number of resource units in a subframe. In particular, one subframe can include the $N_T$ number of symbols. In particular, it is able to define $N_F*N_T$ number of resource units in total.

A D2D transmission resource (unit #0) allocated to a unit number 0 is repeated in every $N_T$ number of subframes. In embodiment of FIG. 10, a resource pool can be repeated with a period of the $N_T$ number of subframes. As shown in FIG. 10, a specific resource unit may periodically and repeatedly appear. Or, an index of a physical resource unit to which a logical resource unit is mapped may change according to a predetermined pattern to obtain a diversity gain in time domain and/or frequency domain. For example, the logical resource unit can hop on time and/or frequency axis according to a predetermined pattern set to an actual physical resource unit. In FIG. 10, a resource pool may correspond to a set of resource units capable of being used by a UE intending to transmit a D2D signal.

The resource pool can be classified into various types. First of all, the resource pool can be classified according to contents of a D2D signal transmitted via each resource pool. For example, the contents of the D2D signal can be classified into various signals and a separate resource pool can be configured according to each of the contents.

Scheduling assignment (SA): The SA may correspond to a signal including information on a resource position of a D2D data channel, information on MCS (modulation and coding scheme) necessary for modulating and demodulating a data channel, information on a MIMO transmission scheme, and the like. SA information may include an identifier of a target UE to which data of each transmission UE is to be transmitted. A signal including the SA information can be transmitted on an identical resource unit in a manner of being multiplexed with D2D data. In this case, an SA resource pool may correspond to a pool of resources that SA and D2D data are transmitted in a manner of being multiplexed.

D2D data channel: The D2D data channel corresponds to a resource pool used by a transmission UE to transmit user data using a resource designated by the SA. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

Discovery message: A discovery message resource pool corresponds to a resource pool for transmitting a discovery message that enables neighboring UEs to discover a transmission UE transmitting information such as ID of the UE, and the like.

As mentioned in the foregoing description, a D2D resource pool can also be classified according to content of a D2D signal. Yet, although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), and the like.

According to the aforementioned contents, a UE intending to transmit data via D2D selects an appropriate resource from an SA pool and transmits SA of the transmission UE. In this case, as a reference for selecting an SA resource pool, it may be able to preferentially select an SA resource interlocked with a resource that satisfies at least one of a resource not transmitting SA of a different UE and a resource which is expected not to transmit data in a following subframe according to SA of a different UE. In addition, the transmission UE may select an SA resource interlocked with a data transmission resource of which an interference level is expected to be low. And, the SA information can be broadcasted. In doing so, UEs belonging to a D2D communication system may receive the broadcasted SA information. In the following, 'transmitting' or 'sending' can be replaced with 'broadcasting'.

In the aforementioned D2D communication, the term 'D2D' can be replaced by 'sidelink'.

Figure 11:
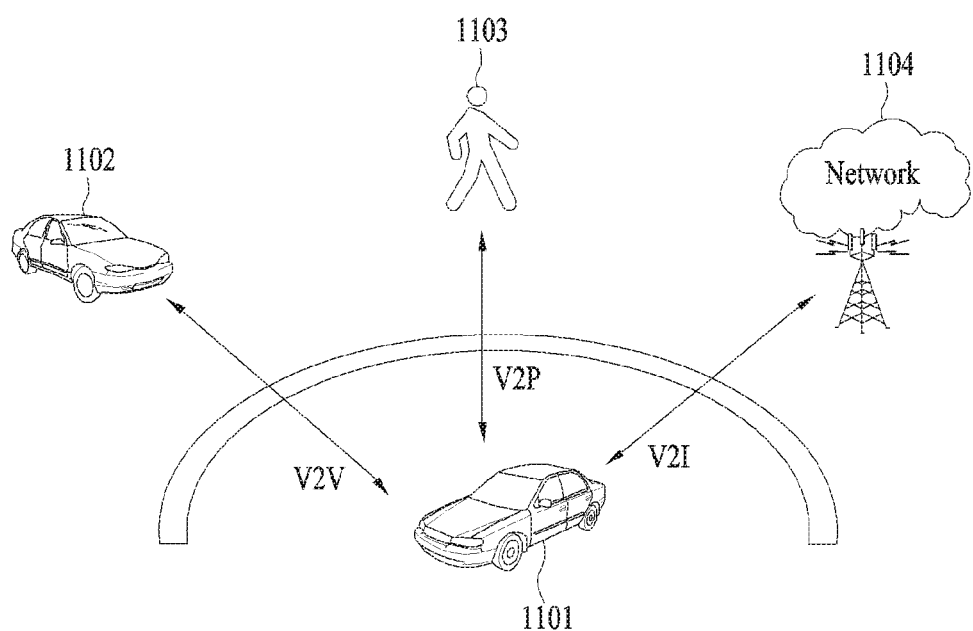
FIG. 11 is a schematic diagram showing a V2X communication network.

FIG. 11 is a schematic diagram showing a V2X communication network. V2X communication may be categorized into V2V (vehicle-to-vehicle) communication, V2P (vehicle-to-pedestrian) communication, and V2I (vehicle-to-infrastructure entity) communication. V2V communication may refer to communication between vehicles 1101 and 1102. Traffic information and the like may be shared between the vehicles 1101 and 1102 through V2V communication. V2P communication may refer to communication between the vehicle 1101 and a device (e.g., a handheld terminal of a pedestrian or a bicycle rider) carried by a pedestrian 1103. Since the pedestrian 1103 can move along a sidewalk adjacent to a road as well, information on a danger on the road and the like may be shared through V2P communication. And, V2I communication may refer to communication between the vehicle and a roadside unit (RSU) 1104. The RSU 1104 may refer to a traffic infrastructure entity. For example, the RSU 1104 may include an entity that transmits a speed notification. For V2X communication, the vehicles 1101 and 1102, the RSU 1004 and the handheld device of the pedestrian 1103 may be equipped with transceivers. V2X communication may be implemented using a technology similar to D2D (device-to-device) communication of the communication standard of the 3GPP (3$^{rd}$ generation partnership project). And, V2X communication may be implemented using DSRC (dedicated short-range communication) technology of IEEE (institute of electrical and electronics engineers).

Hereinafter, a description will be given of a method for transmitting an alarm message in V2X communication according to an embodiment of the present invention. Although the present invention will be described, focusing on V2V communication, the following embodiments can be applied to V2I and/or V2P communication as well. In addition, although the embodiments will be explained with reference to 3GPP communication standards, they can be implemented based on the technologies associated with IEEE communication standards. Moreover, in this specification, the term "transmission" can be interchangeably used with the term "broadcasting". Further, a vehicle or pedestrian may mean a vehicle or pedestrian carrying a user equipment (UE), or it may directly indicate the UE.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 12:
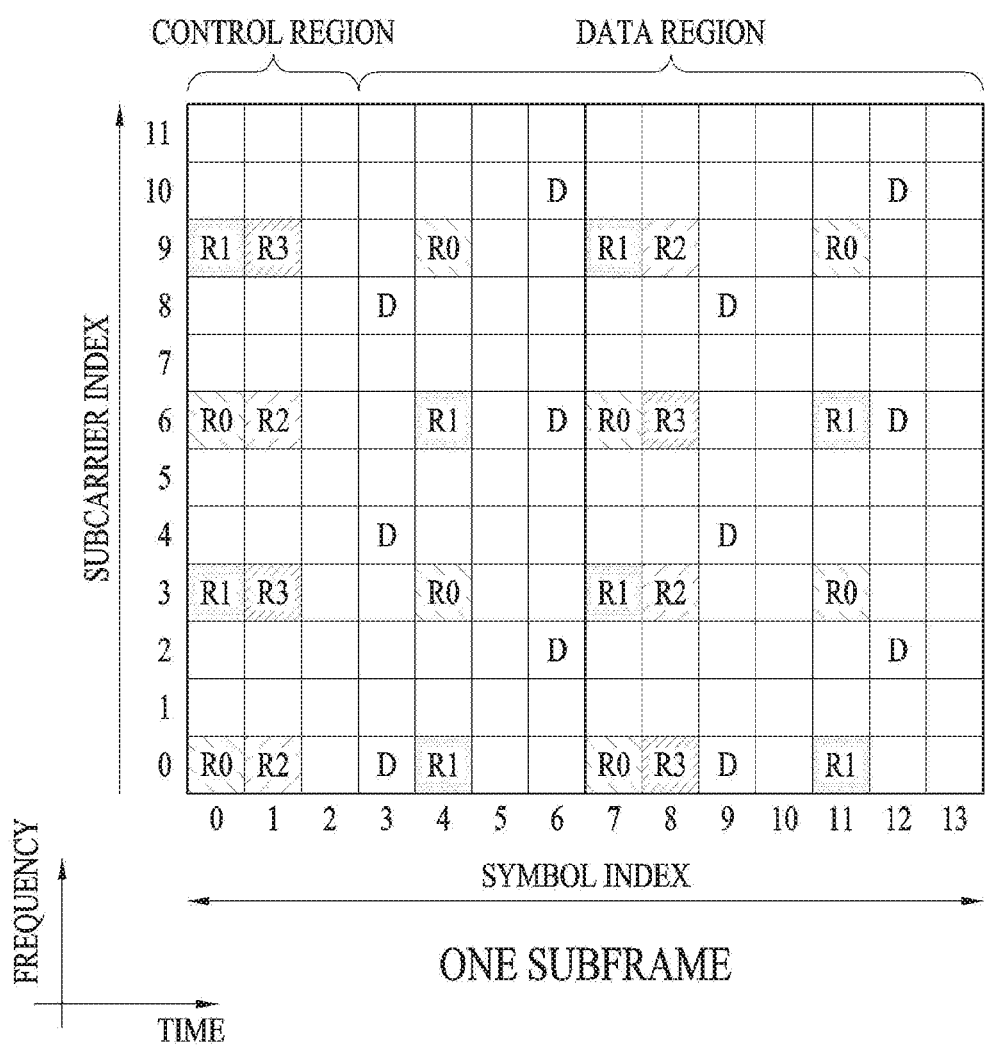
FIG. 12 is a diagram illustrating legacy CRS and DRS patterns.

FIG. 12 illustrates a CRS and DRS pattern for an RB (including 14 OFDM symbols in time by 12 subcarriers in frequency in case of a normal CP) in a system where an eNB has four Tx antennas. In FIG. 12, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 13:
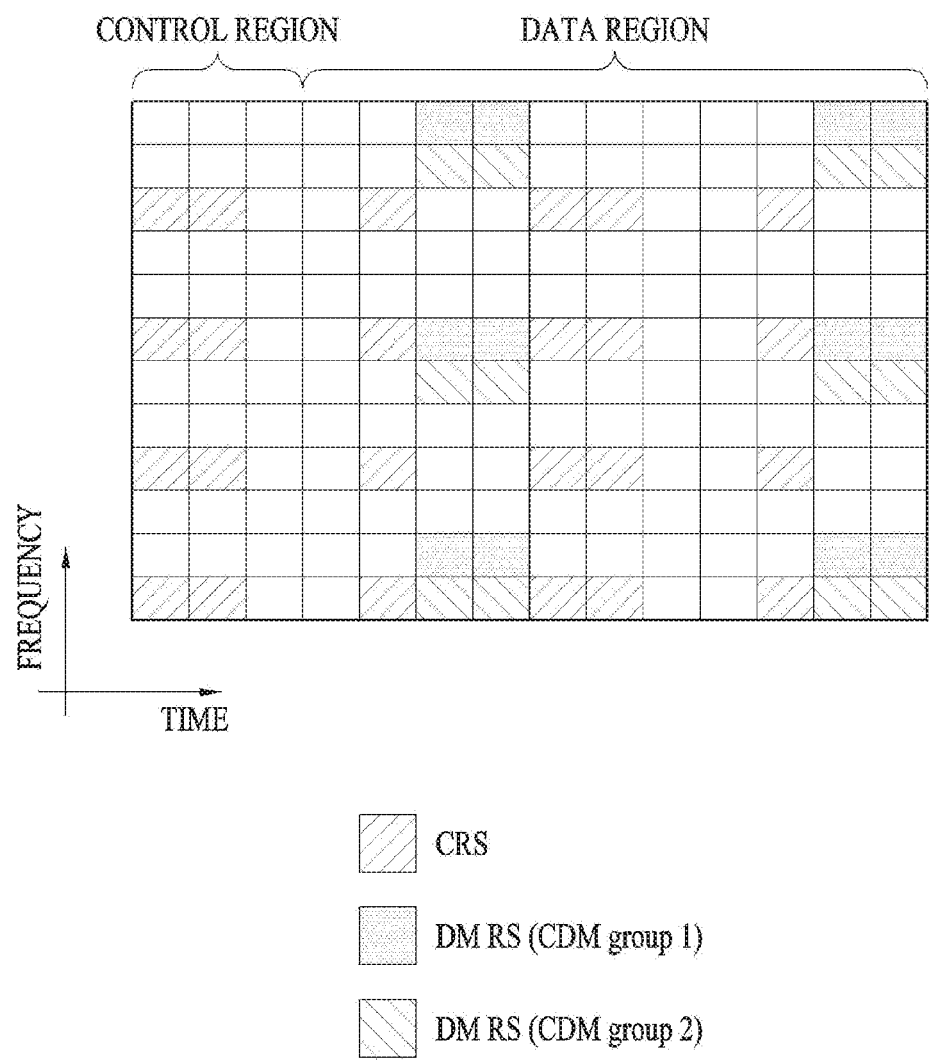
FIG. 13 is a diagram illustrating an example of a DM RS pattern.

FIG. 13 illustrates an exemplary DM RS pattern defined for the LTE-A system. In FIG. 13, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 13, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 14:
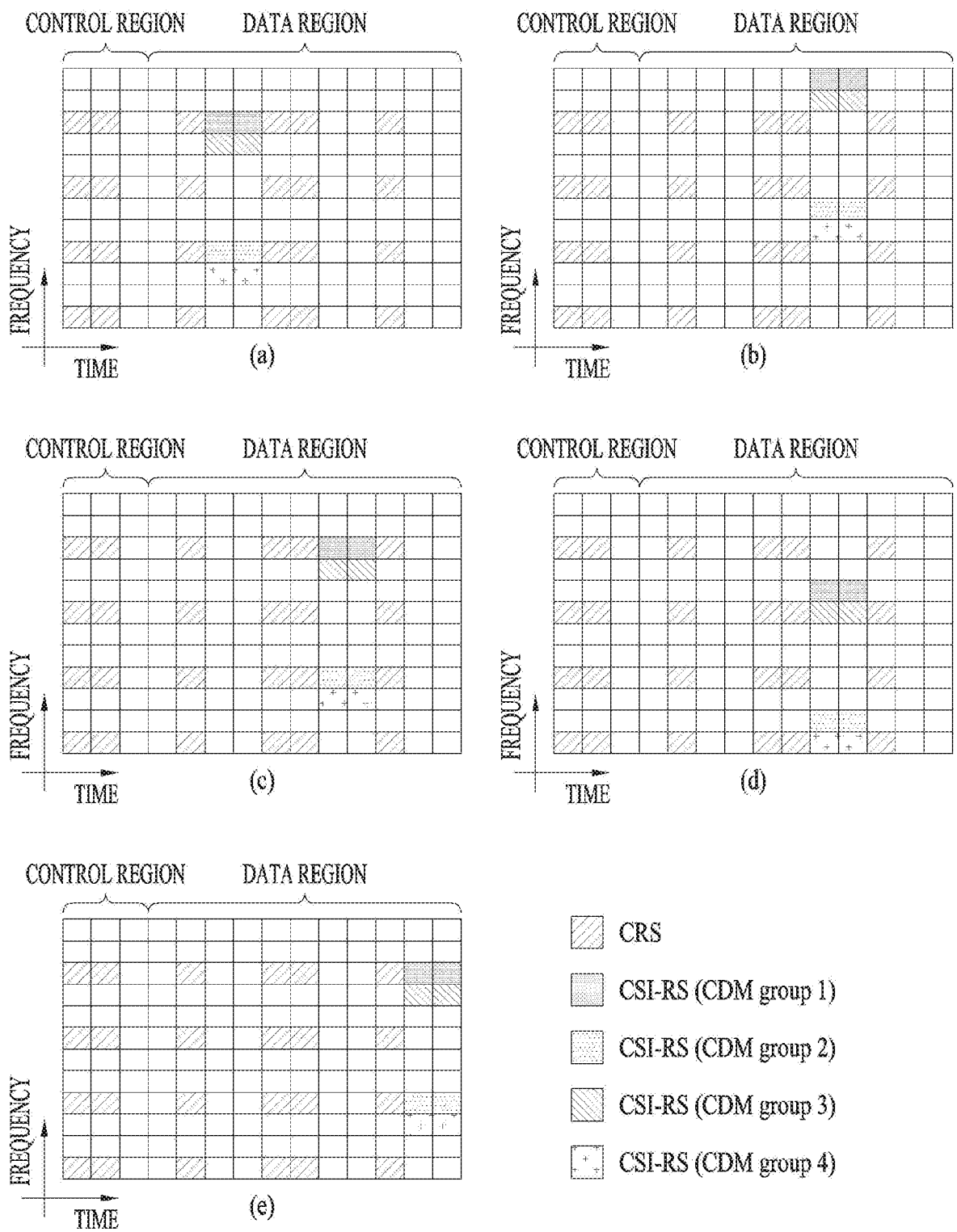
FIG. 14 is a diagram illustrating examples of a CSI-RS pattern.

FIG. 14 illustrates exemplary CSI-RS patterns defined for the LTE-A system. In FIG. 14, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 14(a) to 14(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 14(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 14(a) is applicable to the CSI-RS patterns illustrated in FIGS. 14(b) to 14(e).

RS patterns shown in FIGS. 12 to 14 are disclosed only for illustrative purposes, and the scope or spirit of the present invention are not limited only to a specific RS pattern. That is, even in the case in which RS patterns different from those of FIGS. 12 to 14 are defined and used, various embodiments of the present invention can also be equally applied thereto without difficulty.

Although the following description will be made based on vehicle-to-something (V2X) communication, for example, V2V communication, the invention can be applied to other types of communication including D2D communication. As described above, a frequency offset error may occur in a certain scenario where UEs move (e.g., V2X scenario). For example, if a frequency offset of a received signal goes over a predetermined level due to the Doppler effect, a receiving UE may fail to decode the received signal.

Figure 15A:
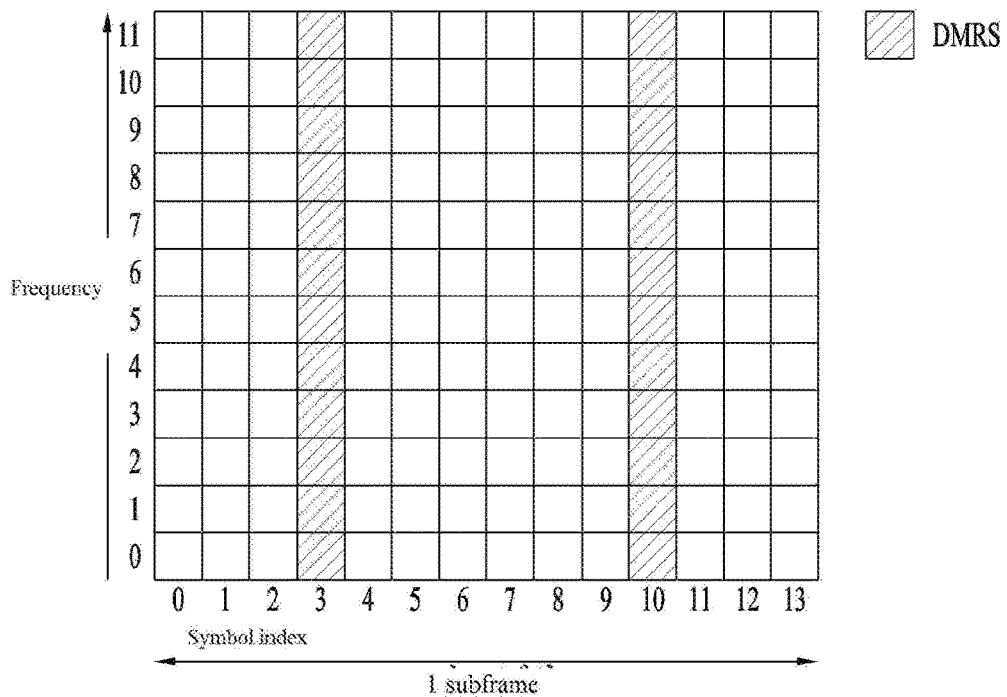
FIG. 15a illustrates DMRS mapping in the case of a normal cyclic prefix (CP).
Figure 15B:
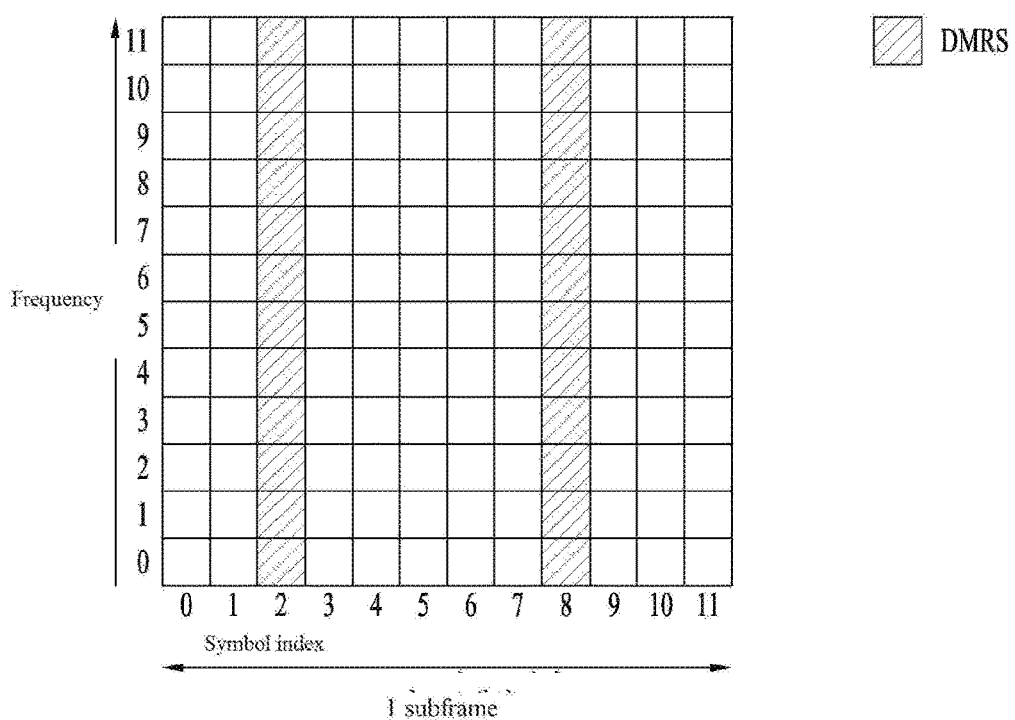
FIG. 15b illustrates DMRS mapping in the case of an extended cyclic prefix (CP).

FIG. 15a illustrates DMRS mapping in the case of a normal cyclic prefix (CP), and FIG. 15b illustrates DMRS mapping in the case of an extended cyclic prefix (CP).

The subframe structure designed for the conventional LTE physical uplink shared channel (PUSCH) can be used in V2X communication. In the current LTE system, a DMRS in a subframe with the normal CP may be mapped as shown in FIG. 15a. For example, referring to FIG. 15a, a DMRS may be mapped to orthogonal frequency division multiplexing (OFDM) symbols 3 and 10. In addition, in the current LTE system, a DMRS in a subframe with the extended CP may be mapped as shown in FIG. 15b. For example, referring to FIG. 15b, a DMRS may be mapped to OFDM symbols 2 and 8.

Meanwhile, in the V2X scenario including the V2V scenario, 5.9 GHz of frequency, which is used for dedicated short range communication (DSRC), has been researched as the center frequency. In addition, for example, an initial frequency offset requirement for V2V communication can be defined as 10 ppm (parts per million). Moreover, a residual frequency offset request may be defined as +/−0.1 ppm. For instance, two vehicles may be synchronized with each other based on a signal provided by a shared eNB, vehicle, or other sources. In this case, a frequency offset difference between the two vehicles may be +/−0.2 ppm. For example, a first vehicle may be synchronized based on a signal from a second vehicle. In this case, a third vehicle may be synchronized with the first vehicle. That is, since the third vehicle is synchronized across the two vehicles, the synchronization of the third vehicle may be referred to as two-hop synchronization (hop-sync). Moreover, a fourth vehicle may be synchronized with the first vehicle. Thus, the fourth vehicle may have two-hop synchronization. In this case, a frequency offset difference between the third and fourth vehicles, which are synchronized with reference to the same first vehicle, may be +/−0.4 ppm. For example, a frequency offset difference between two vehicles with three-hop synchronization with respect to the same vehicle may be +/−0.6 ppm.

When a DMRS is mapped to two OFDM symbols in a subframe as shown in FIG. 15a, a receiving UE (e.g., vehicle) may perform frequency offset correction using the DMRS configured with two columns. In FIG. 15a, there are 5 OFDM symbols between first and second DMRSs. In this case, a time interval of 0.5 ms may exist between the two DMRSs. In addition, since the UE may estimate a change in the frequency offset change based on a change in the phase offset, the UE should be able to estimate the phase offset change due to increase in the frequency offset during 0.5 ms. Table 1 below shows increase in the phase offset during 0.5 ms according to the center frequency and hop synchronization.

TABLE 1

| Center frequency | One-hop sync (0.1 ppm) | Two-hop sync (0.4 ppm) | Three-hop sync (0.6 ppm) |
|---|---|---|---|
| 700 MHz | 70 Hz (0.22 rad) | 280 Hz (0.88 rad) | 420 Hz (1.32 rad) |
| 2 GHz | 200 Hz (0.63 rad) | 800 Hz (2.51 rad) | 1200 Hz (3.77 rad) |
| 5.9 GHz | 590 Hz (1.85 rad) | | |

As shown in Table 1, even though the frequency offset at the center frequency of 700 MHz is +/−0.6 ppm, the increase in the phase offset does not exceed the value of pi. Thus, at the center frequency of 700 MHz, the current DMRS structure can be used for the frequency offset correction. However, when the frequency offset at the center frequency of 2 GHz is +/−0.6 ppm, the phase offset value exceeds the value of pi. In this case, the UE may fail to correct the frequency offset.

Actually, the minimum frequency offset of V2V communication can be defined as +/−0.2 ppm. As described above, when two vehicles are synchronized with reference to the same vehicle or eNB, the frequency offset can be assumed to be +/−0.2 ppm. In this case, as shown in Table 1, a UE operating at the center frequency of 5.9 GHz may not correct the frequency offset using the current DMRS structure (e.g., the structure of FIG. 15a or 15b).

Table 2 shows a phase offset (in the unit of radian) varying depending on an interval between the frequency offset and each DMRS (OFDM symbol unit).

TABLE 2

|  | 0.1 ppm | 0.2 ppm | 0.3 ppm | 0.4 ppm | 0.5 ppm | 0.6 ppm | 0.7 ppm | 0.8 ppm | 0.9 ppm | 1.0 ppm |
|---|---|---|---|---|---|---|---|---|---|---|
| 1 symbol | 0.264791 | 0.529583 | 0.794374 | 1.059165 | 1.323957 | 1.588748 | 1.853539 | 2.118331 | 2.383122 | 2.647913 |
| 2 symbols | 0.529583 | 1.059165 | 1.588748 | 2.118331 | 2.647913 | 3.1775 | 3.70708 | 4.23666 | 4.76624 | 5.29583 |
| 3 symbols | 0.794374 | 1.588748 | 2.383122 | 3.1775 | 3.97187 | 4.76624 | 5.56062 | 6.35499 | 7.14937 | 7.94374 |
| 4 symbols | 1.059165 | 2.118331 | 3.1775 | 4.23666 | 5.29583 | 6.35499 | 7.41416 | 8.47332 | 9.53249 | 10.5917 |
| 5 symbols | 1.323957 | 2.647913 | 3.97187 | 5.29583 | 6.61978 | 7.94374 | 9.2677 | 10.5917 | 11.9156 | 13.2396 |
| 6 symbols | 1.588748 | 3.1775 | 4.76624 | 6.35499 | 7.94374 | 9.53249 | 11.1212 | 12.71 | 14.2987 | 15.8875 |
| 7 symbols | 1.853539 | 3.70708 | 5.56062 | 7.41416 | 9.2677 | 11.1212 | 12.9748 | 14.8283 | 16.6819 | 18.5354 |
| 8 symbols | 2.118331 | 4.23666 | 6.35499 | 8.47332 | 10.5917 | 12.71 | 14.8283 | 16.9466 | 19.065 | 21.1833 |
| 9 symbols | 2.383122 | 4.76624 | 7.14937 | 9.53249 | 11.9156 | 14.2987 | 16.6819 | 19.065 | 21.4481 | 23.8312 |
| 10 symbols | 2.647913 | 5.29583 | 7.94374 | 10.5917 | 13.2396 | 15.8875 | 18.5354 | 21.1833 | 23.8312 | 26.4791 |
| 11 symbols | 2.912705 | 5.82541 | 8.73811 | 11.6508 | 14.5635 | 17.4762 | 20.3889 | 23.3016 | 26.2143 | 29.127 |
| 12 symbols | 3.1775 | 6.35499 | 9.53249 | 12.71 | 15.8875 | 19.065 | 22.2425 | 25.42 | 28.5975 | 31.775 |
| 13 symbols | 3.44229 | 6.88457 | 10.3269 | 13.7691 | 17.2114 | 20.6537 | 24.096 | 27.5383 | 30.9806 | 34.4229 |
| 14 symbols | 3.70708 | 7.41416 | 11.1212 | 14.8283 | 18.5354 | 22.2425 | 25.9495 | 29.6566 | 33.3637 | 37.0708 |

As shown in Table 2, when the frequency offset is +/−0.2 ppm, a DMRS needs to be mapped at an interval consisting of at least five symbols for the frequency offset correction. In addition, when the frequency offset is +/−0.4 ppm, a DMRS needs to be mapped at an interval consisting of at least two symbols. When the frequency offset is +/−0.6 ppm, a DMRS needs to be mapped at an interval consisting of at least one symbol.

Hereinafter, a method for mapping and transmitting a DMRS for frequency offset correction in V2X communication will be described. Resources may experience phase changes in the time domain due to not only the frequency offset but also the Doppler effect. For example, assuming that each vehicle moves at a speed of 140 km, the relative speed between two vehicles moving in opposite directions becomes 280 km, and thus, the phase change due to the Doppler effect may significantly increase. In addition, since the phase change caused by the frequency offset linearly increases depending on time, whereas the phase change caused by the Doppler effect has nonlinear characteristics. That is, the phase change caused by the Doppler effect may cause a serious error to the wireless communication system.

Therefore, an interval between symbols where a DMRS is mapped needs to be shortened for the frequency offset correction. However, when the symbol interval related to DMRS mapping is shortened, the DMRS may not be mapped evenly in one subframe. For example, referring to FIG. 15, a DMRS may be mapped to OFDM symbols 5 and 7 instead of OFDM symbols 3 and 10. In this case, an interval between symbols where the DMRS is mapped is reduced, but DMRS mapping in one subframe becomes unequal. Thus, DMRS-based channel estimation performance may be degraded. This is because the channel estimation performance cannot be guaranteed at symbols far away from the symbols where the DMRS is mapped.

Thus, a method of increasing the number of symbols where a DMRS is mapped in one subframe can be considered. For example, a DMRS may be mapped to four symbols as shown in FIGS. 16a to 16e. That is, by reducing an interval between symbols where a DMRS is mapped, it is possible to improve frequency offset correction performance and at the same time, maintain or improve the channel estimation performance.

Figure 16A:
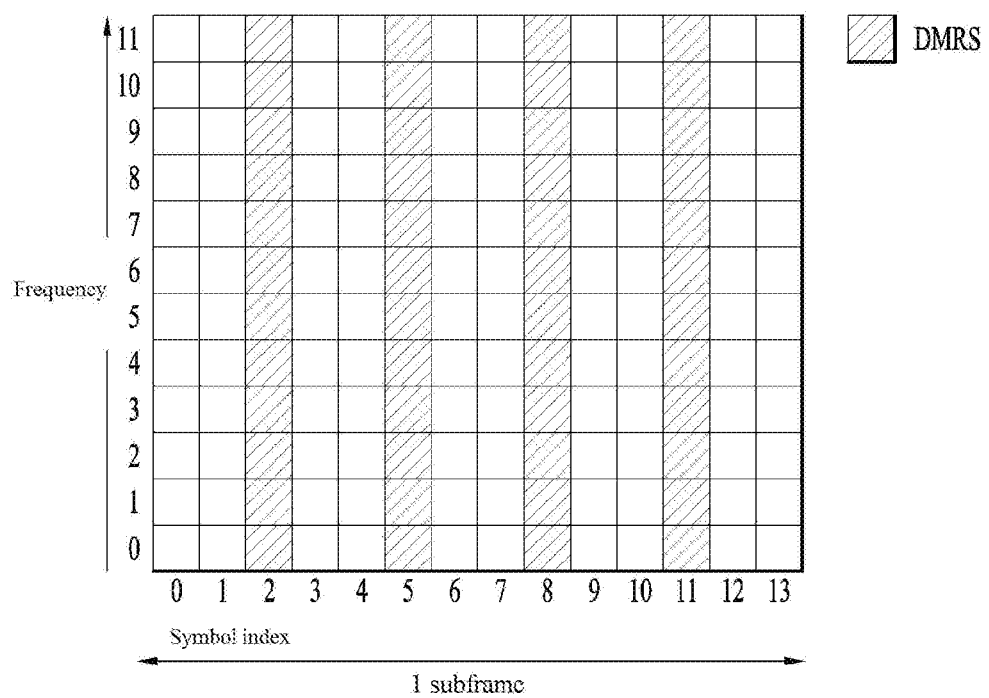
FIGS. 16a to 16e illustrate DMRS mapping according to an embodiment.

For example, in the case of the normal cyclic prefix, a DMRS may be mapped to symbols 2, 5, 8 and 11 as shown in FIG. 16a. In this case, since the DMRS is uniformly mapped in one subframe, the channel estimation performance can be improved. In addition, since the DMRS mapping interval is reduced compared to that of the current LTE uplink DMRS (cf. FIGS. 15a and 15b), the frequency offset correction performance can also be improved.

Figure 16B:
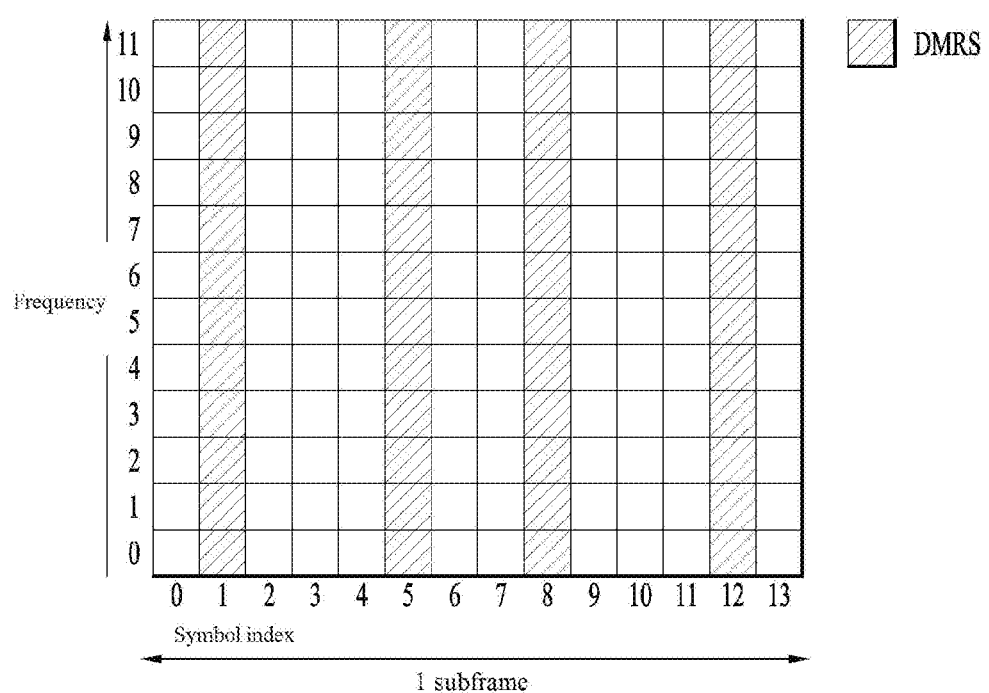

In addition, a DMRS may be mapped to symbols 1, 5, 8, and 12 as shown in FIG. 16b. In this case, since an average DMRS interval is larger than that of FIG. 16a, the frequency offset correction may have lower performance than that of FIG. 16a. However, in FIG. 16b, since a DMRS is mapped to both ends of the subframe (i.e., symbols 1 and 12), outer polation, outer polation may be reduced for the channel estimation. That is, the channel estimation performance may be improved compared to the DMRS mapping of FIG. 16a.

In FIGS. 16a and 16b, a DMRS may be mapped at an interval of three or more symbols.

Figure 16C:
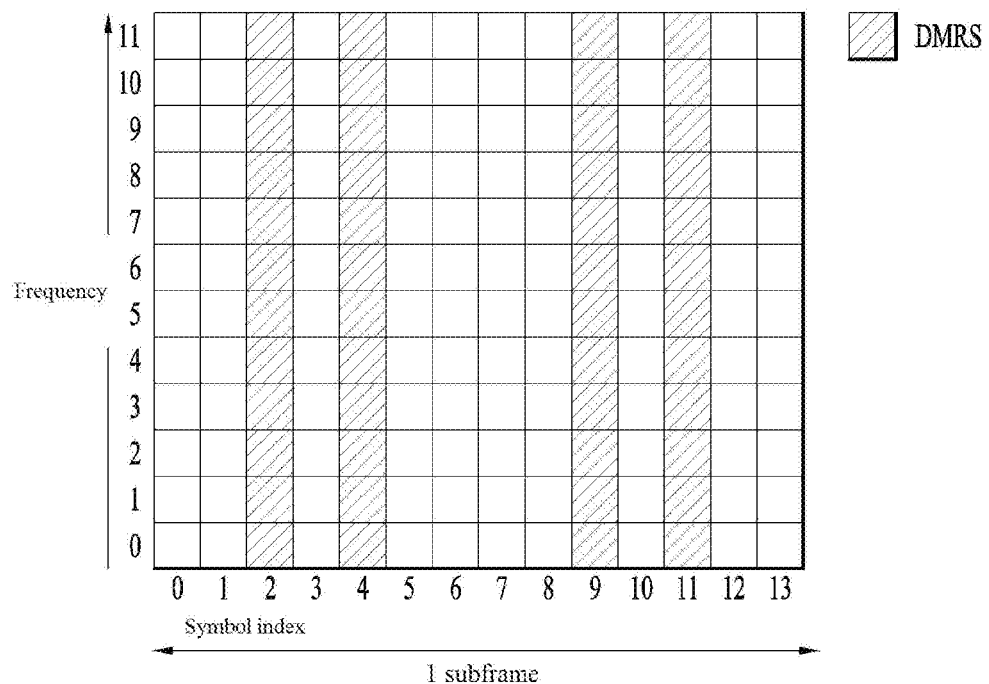
Figure 16D:
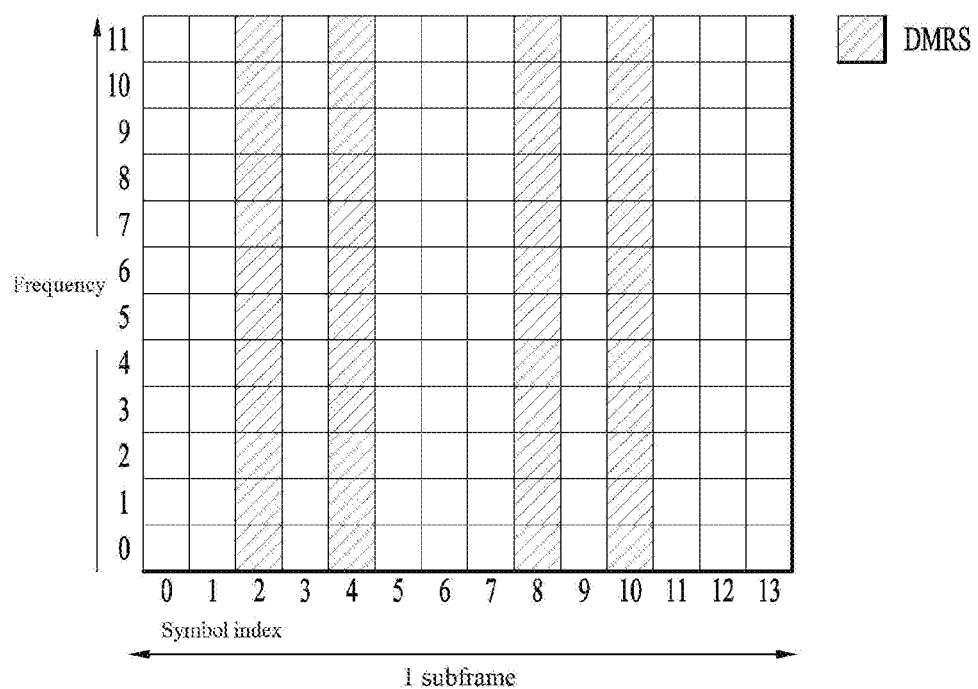

Moreover, a DMRS may be mapped to OFDM symbols 2, 4, 9, and 11 as shown in FIG. 16c or OFDM symbols 2, 4, 8, and 10 as shown in FIG. 16d. In FIGS. 16c and 16d, one subframe may include two pairs of DMRSs mapped at a two-symbol interval. In this case, a received end can correct a phase offset using a DMRS pair. Thus, compared to FIGS. 16a and 16b, the frequency offset correction performance can be improved.

Figure 16E:
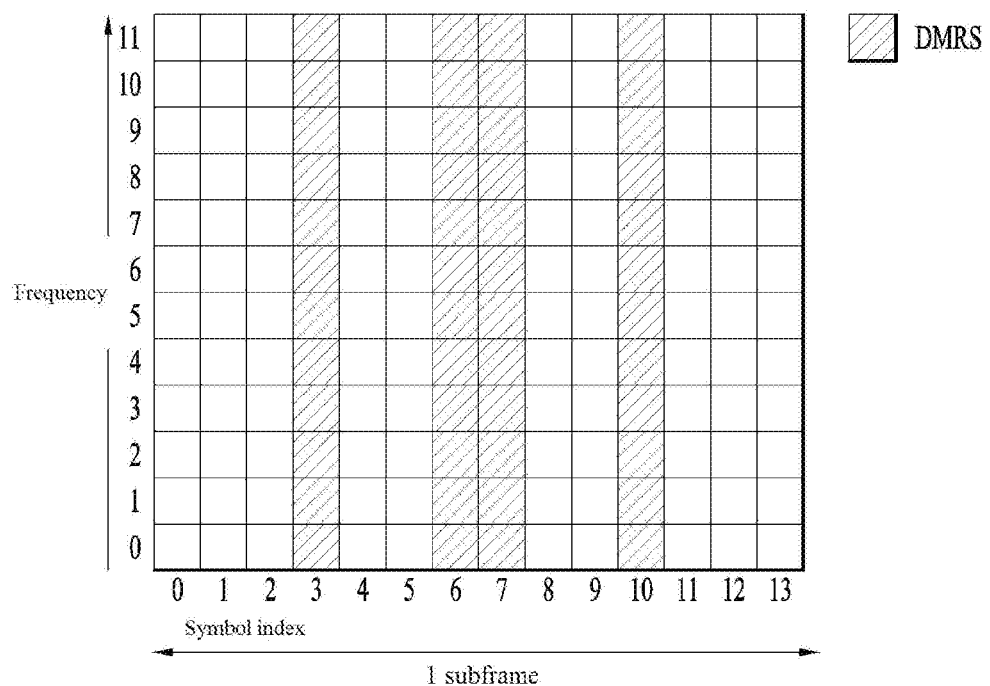

Further, a DMRS may be mapped to OFDM symbols 3, 6, 7, and 10 as shown in FIG. 16e. That is, the DMRS may be first mapped as shown in FIGS. 15a and 15b and then additionally mapped to two consecutive symbols between the DMRSs shown in FIG. 15a or 15b. In this case, since the DMRS is mapped to symbols 6 and 7 at one symbol interval, the frequency offset correction performance can be improved.

In the above description, an interval between symbols where a DMRS is mapped may be represented as distance from one DMRS symbol to the next DMRS symbol. Thus, a DMRS mapped at one OFDM symbol interval may mean that the DMRS is mapped to consecutive symbols.

In addition, a DMRS may be mapped in a comb-type manner. That is, in the comb type mapping, the DMRS may be mapped to resource elements with either even or odd subcarrier indices in one symbol.

Figure 17A:
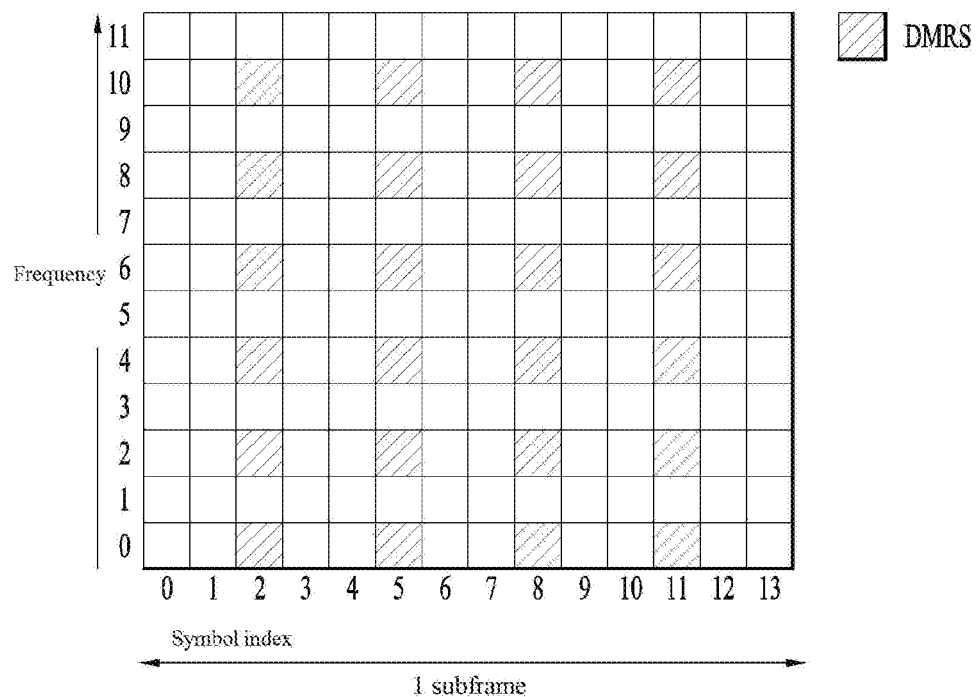
FIGS. 17a and 17b illustrate comb-type DMRS mapping according to an embodiment.

For example, FIG. 17a shows an example of applying the comb type mapping to the DMRS of FIG. 16a. Although FIG. 17a shows that a DMRS is mapped to resource elements with even subcarrier indices, the DMRS may be mapped to resource elements with odd subcarrier indices.

Figure 17B:
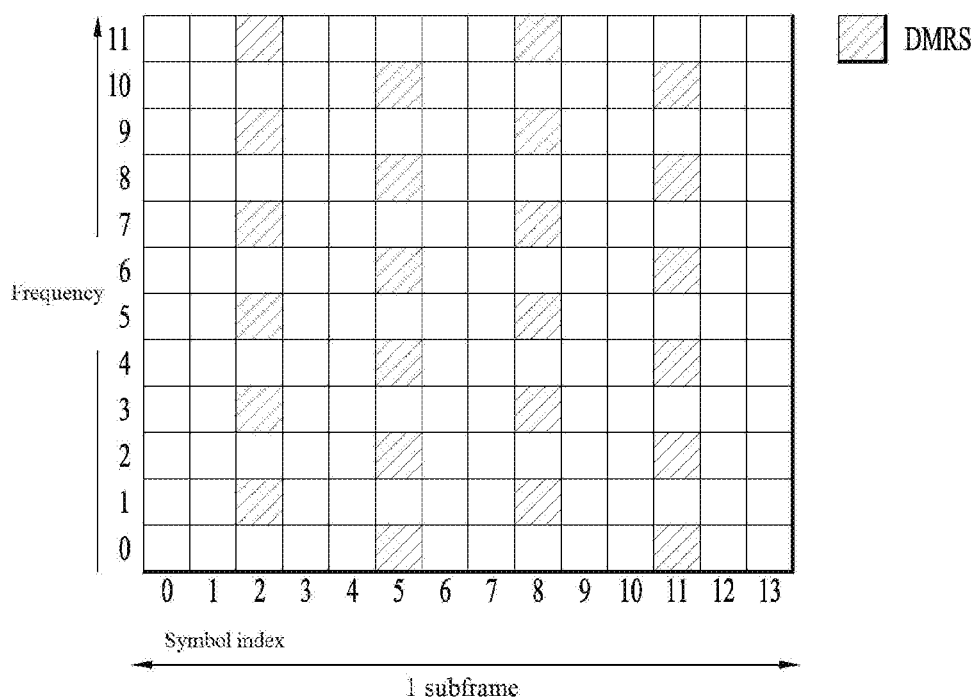

Moreover, as shown in FIG. 17b, a DMRS may be mapped alternately to resource elements with even subcarrier indices and resource elements with odd subcarrier indices in each DMRS symbol. Although FIG. 17b shows that the DMRS is mapped to in the following order from resource elements with odd indices to resource elements with even indices, the DMRS mapping may be performed in the opposite order.

Although FIGS. 17a and 17b are illustrated with reference to FIG. 16a, the DMRSs shown in FIGS. 16b to 16e may be mapped in the same manner. Additionally, the comb type mapping may be applied to only some DMRS. For example, the comb type mapping may be applied to the DMRS mapped to symbols 6 and 7 in FIG. 16e.

The DMRS mapping described with reference to FIGS. 16a to 17b is merely exemplary and the DMRS mapping of the present invention is not limited thereto. In the present invention, a DMRS can be mapped to four symbols in one subframe, and the four symbols may be randomly selected. In addition, in at least one symbol in the one subframe, a DMRS may be mapped in a comb-type manner.

However, when the DMRS are mapped to the four symbols in the one subframe as described above with reference to FIGS. 16a to 17b, data transmission efficiency may be degraded due to DMRS overhead. Thus, the DMRS mapping shown in FIGS. 16a to 17b may be applied only to some subframes among subframes used for transmission. For example, in some subframes, a DMRS may be mapped to four symbols, and in the remaining subframes, a DMRS may be mapped to two symbols as shown in FIG. 15a or 15b. In addition, for example, in some subframes, DMRS mapping for the frequency offset correction may be used, and in the remaining subframes, the conventional LTE uplink DMRS mapping or DMRS mapping for the channel estimation may be used.

For example, the DMRS mapping for the frequency offset correction may mean that DMRSs of at least one DMRS pair are mapped at an interval consisting of two symbols or fewer. That is, the DMRS mapping shown in FIGS. 16c to 16e may be considered as the DMRS mapping for the frequency offset correction. In this specification, the DMRS mapping for the frequency offset correction can be referred to first DMRS mapping. In addition, for example, the DMRS mapping for the channel estimation may mean that all DMRSs are mapped to an interval consisting of three symbols or more. That is, the DMRS mapping of FIGS. 16a and 16b may be considered as the DMRS mapping for the channel estimation. In the following description, the DMRS mapping for the channel estimation can be referred to second DMRS mapping.

Hereinafter, a description will be given of a reference signal transmission method with reference to FIGS. 18 to 19b.

For example, transmission may be performed using a plurality of subframes. In this case, in the first and last subframes among the plurality of subframes, a DMRS may be mapped according to the first DMRS mapping, and in the remaining subframes, a DMRS may be mapped to according to the conventional LTE uplink DMRS mapping (FIG. 15a) or the second DMRS mapping.

For example, four subframes may be used for data transmission as shown in FIG. 18. For example, in the first and last subframes, a DMRS may be mapped as shown in FIG. 16e, and in the remaining subframes, the conventional LTE uplink DMRS mapping (FIG. 15a) or the second DMRS mapping (e.g., FIG. 16a) may be used. In this case, the first and last subframes may be used to obtain a phase offset correction value, and the obtained phase offset correction value can be applied to the remaining subframes.

That is, when the phase offset correction value is obtained from some subframes (e.g., subframes where a DMRS is mapped according to the first DMRS mapping) and then the obtained phase offset correction value is applied to the remaining subframes, the phase offset correction performance can be improved. In addition, when the DMRS mapping for the channel estimation (second DMRS aping) is applied to the remaining subframes, the channel estimation performance may be improved. Further, when the conventional LTE uplink DMRS mapping is applied to the remaining subframes, the data transmission efficiency may be improved.

For instance, data may be transmitted using four subframes as shown in FIG. 18. In this case, in the first and fourth subframes, a DMRS can be mapped according to the first DMRS mapping. For example, in the first and fourth subframes, a DMRS may be mapped as shown in FIG. 16c, 16d or 16e. A receiving end may calculate a correction value for the frequency phase offset using the first and fourth subframes. In addition, the receiving end may correct the phase offset by applying the correction value to the four subframes. In this case, DMRS-based channel estimation may be performed on each of the subframes. In the second and third subframes, a DMRS may be mapped according to the conventional LTE uplink DMRS mapping (cf. FIG. 15a).

Referring back to FIG. 18, the DMRS mapping for the channel estimation (second DMRS mapping) may be used in subframes except the subframes located at the both ends (i.e., first and fourth subframes). For example, in the first and fourth subframes, a DMRS may be mapped as shown in FIG. 16c, 16d or 16e. A receiving end may calculate a correction value for the frequency phase offset using the first and fourth subframes. In addition, the receiving end may correct the phase offset by applying the correction value to the four subframes. In this case, DMRS-based channel estimation may be performed on each of the subframes. In the second and third subframes, a DMRS may be mapped according to the second DMRS mapping (for example, as shown in FIG. 16a or 16b).

Moreover, the DMRS mapping for the phase offset correction may be applied to a center subframe among subframes used for data transmission. Here, the center subframe may mean a subframe closest to the center point between the first and last subframes used for data transmission in the time domain. If the number of subframes closest to the center point is two, one of the two subframes may be determined as the center subframe. For example, the subframe close to the first subframe or the subframe close to the last subframe may be determined as the center subframe.

When the first DMRS mapping is applied to the center subframe, the conventional LTE uplink DMRS mapping or second DMRS mapping may be applied to the remaining subframes. In this case, compared to the case where the first DMRS mapping is applied to the first and last subframes, the number of subframes used for the phase offset correction may be decreased. Thus, overall channel estimation performance and/or data transmission efficiency may be improved.

For example, when four subframes are used for data transmission as shown in FIG. 18, the second or third subframe may be determined as the center subframe. For example, the first DMRS mapping is applied to the center subframe (e.g., FIG. 16c, 16d, or 16e), and the conventional LTE uplink DMRS mapping (cf., FIG. 15a) or second DMRS mapping (e.g., FIG. 16a or 16b) may be applied to the remaining subframes. In this case, the center subframe may be mainly used to obtain the phase offset correction value. In this case, a receiving end may perform the phase offset correction on all the subframe using the obtained correction value. When the second DMRS mapping is applied to the remaining subframes, the receiving end may expect that the channel estimation performance will be improved. When the conventional LTE uplink DMRS mapping is applied to the remaining subframes, the transmission efficiency may be improved.

For example, referring to FIG. 18, in the second or third subframe, a DMRS may be mapped as shown in FIG. 16c, and in the remaining subframes, a DMRS may be mapped as shown in FIG. 15a. In addition, for example, in the second or third subframe, a DMRS may be mapped as shown in FIG. 16c, and in the remaining subframes, a DMRS may be mapped as shown in FIG. 16a or 16b. In the above-described embodiments, it can be assumed that the phase offset value is not significantly changed over some subframes. To make this assumption be valid, a subframe interval can be limited. For example, when an interval between the first and last subframes is smaller than a predetermined number (e.g., a natural number N), the frequency offset correction may be applied. Although it is illustrated in FIG. 18 that four subframes are consecutive, four non-consecutive subframes can be used for data transmission. For example, when the interval between the first and last subframes among the data transmission subframes is equal to or smaller than N, the DMRS mapping for the frequency offset correction (first DMRS mapping) may be used. For example, the first DMRS mapping may be applied to the first, center and/or last subframe only when the subframe interval is equal to or smaller than N. In addition, all the subframes (including subframes that are not used for V2X communication data transmission) between the first and last subframes can be grouped into a plurality of groups. In this case, for example, each group may be configured to include N subframes. Moreover, in each group, the first DMRS mapping may be applied to the first, center and/or last subframe in the group as described above. Further, the conventional LTE uplink DMRS mapping or second DMRS mapping may be applied to the remaining subframes in the group. For example, as shown in FIG. 19a, each group may be configured to include four subframes. In this case, only some subframes in each group may be used for V2X data transmission.

For instance, the subframes may be grouped into a plurality of groups such that each of the group includes N subframes. In this case, each group may include subframes that are not used for V2X data transmission. In each group, the first DMRS mapping may be applied to a predetermined number of subframes (e.g., L subframes, where L is a natural number greater than 1 and smaller than N). In addition, the conventional LTE uplink DMRS mapping or second DMRS mapping may be applied to the remaining subframes in each group. In this case, in each group, the phase offset correction may be performed using the L subframes where a DMRS is mapped according to the first DMRS mapping. Moreover, each group may have a different value of L.

For example, four subframes may be used for V2X data transmission as shown in FIG. 19b. Specifically, referring to FIG. 19b, subframes 0, 11, 12 and 14 may be used for the V2X data transmission. In addition, for example, each group may be configured to include ten subframes. In this case, subframes 0 to 9 may be set to a first group, and subframes 10 to 19 may be set to a second group. In addition, one group may include at least one subframe where a DMRS is mapped according to the first DMRS mapping. In this case, in the first group, only subframe 0 is used for the V2X data transmission. Thus, subframe 0 may include DMRSs mapped according to the first DMRS mapping. In the second group, subframes 11, 12 and 14 are used for the V2X data transmission. In this case, at least one of subframes 11, 12, and 14 may include DMRSs mapped according to the first DMRS mapping. For example, in the second group, subframe 14 closest to the center thereof may include DMRSs mapped according to the first DMRS mapping as described above. Moreover, for example, in the first and last subframes among the subframes used for the V2X data transmission in the second group (subframes 11 and 14), a DMRS may be mapped according to the first DMRS mapping. In this case, in the remaining subframes, a DMRS may be mapped according to the conventional LTE uplink DMRS mapping or second DMRS mapping.

In addition, DMRS mapping can be differently applied to control and data channels. For example, the first DMRS mapping may be applied to the control channel, and the conventional LTE uplink DMRS mapping or second DMRS mapping may be applied to the data channel. In this case, the phase offset correction value obtained from the DMRS on the control channel can be applied to the data channel.

Moreover, for example, when the first DMRS mapping is applied to the control channel, the phase offset correction value may be applied only to subframes in the range of N subframes from a subframe in which the control channel is transmitted. In addition, in subframes out of the range of N subframes from the subframe in which the control channel is transmitted, a DMRS may be mapped as in the aforementioned embodiments. For example, the phase offset correction value obtained from the control channel may be applied to subframes in the range of ten subframes from the subframe in which the control channel is transmitted. In next subframes, the first DMRS mapping is applied to the first and last subframes or the center subframe. Alternatively, a DMRS may be mapped according to the first DMRS mapping based on a subframe group.

In the aforementioned embodiments, N and/or L may have a predetermined value, or the value of N and/or L may be transmitted to a UE through higher layer signaling (e.g., radio resource control (RRC) signaling).

Further, data may be continuously transmitted in a plurality of subframes like a periodic message. In this case, a UE, a road side unit, or a base station can apply the above-described embodiments every period corresponding to P times of the message transmission period, where P is an integer equal to or greater than 1. The value of P may be predetermined or transmitted to the UE through higher layer signaling (e.g., RRC signaling). For example, whenever transmitting a periodic message in the turn corresponding to a multiple of P, the UE may transmit a message including information on DMRSs mapped according to the first DMRS mapping. In addition, when transmitting a periodic message in the turn not corresponding to a multiple of P, the UE may transmit a message including information on DMRSs mapped according to the conventional LTE uplink DMRS mapping or second DMRS mapping.

Hereinafter, a description will be given of an orthogonal cover code (OCC) applicable to the aforementioned DMRS mapping.

In the current LTE communication system, since a DMRS is mapped to two symbols as shown in FIGS. 15a and 15b, [1 1] and [1 −1] are used as the OCC. However, when a DMRS is mapped to four symbols as in the above-described embodiments, the current OCC cannot be used as it is.

In this case, the OCC may be composed of [1, 1, 1, 1], [1, 1, −1, −1], [1, −1, 1, −1] and [1, −1, −1, 1]. When the OCC is known to both transmitting and receiving ends, the receiving end can detect the DMRS using the known OCC. However, when the receiving end is not aware of the OCC, the receiving end should perform blind decoding for the DMRS. In addition, each OCC may be configured to be different according to priority of a corresponding message. In addition, each OCC may be set to be different according to types of transmitting UEs and/or types of target UEs. For example, the transmitting UE and/or receiving UE may include a pedestrian, a vehicle, and/or an RSU. In this case, the receiving UE may determine whether a phase difference between two adjacent OFDM symbols where a DMRS is mapped is π. If the phase offset caused by the Doppler effect or frequency offset is present, the phase offset may exceed π/2. When the phase offset is greater than π/2, the UE cannot identify the OCC. Thus, if an interval between symbols where a DMRS is mapped is increased, the receiving end may not identify the OCC.

For example, the OCC can be used only when an interval between OFDM symbols where a DMRS is mapped is equal to or smaller than dl. For example, dl may be set to 2. In this case, the OCC may be designed such that the same weight is applied to symbols where a DMRS with an interval greater than dl is mapped.

When dl is 2, the OCC cannot be applied to the DMRS mapping of FIGS. 16a and 16b. Thus, a fixed OCC may be applied to all DMRS symbols. For instance, the OCC of [1, 1, 1, 1] may be used.

In addition, for example, when dl is 2, the OCC can be applied to symbols 2 and 4 and symbols 9 and 11 in the DMRS mapping of FIG. 16c. For instance, the OCC of [1, 1] or [1, −1] may be applied to symbols 2 and 4, and the OCC of [1, 1] or [1, −1] may be applied to symbols 9 and 11.

Moreover, for example, when dl is 2, the OCC can be applied to symbols 2 and 4 and symbols 8 and 10 in the DMRS mapping of FIG. 16d. For instance, the OCC of [1, 1] or [1, −1] may be applied to symbols 2 and 4, and the OCC of [1, 1] or [1, −1] may be applied to symbols 8 and 10.

Furthermore, for example, when dl is 2, the OCC can be applied to symbols 6 and 7 in the DMRS mapping of FIG. 16e. For instance, the OCC of [1, 1] or [1, −1] may be applied to symbols 6 and 7. When the OCC of [1, 1] is applied to symbols 6 and 7, the fixed OCC, [1, 1] may be applied to the remaining symbols (symbols 3 and 10). In addition, when the OCC of [1, −1] is applied to symbols 6 and 7, the fixed OCC, [1, −1] may be applied to the remaining symbols (symbols 3 and 10). By applying the same OCC to symbol 7 and 10, which has an interval of three symbols, symbols 7 and 10 may have the same phase difference. Thus, it is possible to reduce ambiguity of the phase offset.

When an interval between OFDM symbols where a DMRS is mapped is equal to or smaller than dl, the OCC may not be applied to all DMRSs. This is because there is no DMRS pair with an interval equal to or smaller than dl. In addition, in this case, there may be no DMRS pair for phase offset correction.

Thus, when the DMRS mapping is performed as shown in FIGS. 16a and 16b, the OCC is not applied to all DMRS symbols. Alternatively, a fixed OCC (e.g., [1, 1, 1, 1]) may be applied.

In addition, for example, when dl is 2, in the DMRS mapping of FIG. 16c, symbols 2 and 4 form a group, and symbols 9 and 11 form another group. The OCC of [1, 1] or [1, −1] may be applied to each group.

Moreover, for example, when dl is 2, in the mapping of FIG. 16d, symbols 2 and 4 form a group, and symbols 8 and 10 form another group. The OCC of [1, 1] or [1, −1] may be applied to each group.

Furthermore, for example, when dl is 2, in the mapping of FIG. 16e, symbols 6 and 7 are grouped into a group. In addition, symbol 3 may considered as another group, and symbol 10 may considered as still another group. That is, the DMRS of FIG. 16 may be grouped into three groups. In this case, the OCC of [1, 1, 1], [1, $e^{j2\pi/3}$, $e^{j4\pi/3}$], or [1, $e^{j4\pi/3}$, $e^{j2\pi/3}$] may be applied to each group.

In the aforementioned embodiments related to the OCC, a receiving end can perform blind detection for the OCC. Similarly, the receiving end can be configured to perform blind detection for a cyclic shift (CS) and/or base sequence. When the DMRS is blind-detected as described above, the receiving end can easily determine phase offsets of DMRS symbols where the same DMRS sequences are used. However, the receiving end may have difficulties in determining phase offsets of DMRS symbols where different DMRS sequences are used. Therefore, information of the DMRS symbols using the same DMRS sequences may be preconfigured. For example, a DMRS symbol pair where the same DMRS sequences are used may be predetermined. In addition, information on the DMRS symbol pair where the same DMRS sequences are used may be transmitted to a UE.

As described above, when a DMRS is mapped to three symbols or more in one subframe, the current based sequence may be changed. In the current LTE system, one DMRS is mapped to each slot. In addition, the DMRS base sequence is hopping in each slot. By using a different DMRS base sequence in each slot, it is possible to mitigate interference therebetween. Therefore, according to the present invention, the DMRS base sequence can hops in each DMRS symbol. This is because although a UE has a single overlapping DMRS symbol with another UE, it is possible to avoid other DMRS symbols in a subframe from overlapping with another UE.

Regarding the current LTE system, an enhanced receiver has been researched. According to the enhanced receiver, a local DMRS sequence is extracted from a received signal in the time domain, and the time-domain signal is divided into two parts for comparison thereof, and phase offsets can be measured by comparing them within a symbol. In the case of the enhanced receiver, it is desirable that a DMRS is uniformly distributed in a subframe. However, this method may show different performance depending on DMRS sequences According to the results of experimenting 30 base sequences with respect to a single resource block, it can be seen that base sequences with values of u of 20, 2, 12, and 0 shows the best performance in a block error rate (BLER) of 1/100 or less. In this case, it is assumed that information bits are 40 bits, a relative speed is 280 km, a carrier frequency is 6 GHz, a synchronization error is 0.3 ppm, and a frequency offset is 1.8 KHz.

Thus, when a different base sequence is used in each DMRS symbol, the base sequences with the values of u of 20, 2, 12, and 0 can be used for a physical sidelink control channel (PSCCH). In addition, based on the experiment results, the base sequence with the value of u of 20 or 2 may be used. In this case, the value of u can be considered as that of the LTE uplink DMRS base sequence. In the LTE system, the value of u corresponds to a sequence-group number in a slot $n_s$ defined by a group hopping pattern $f_{gh}(n_s)$ and a sequence-shift pattern $f_{ss}$ in the LTE system. In the current LTE communication system, the value of u is defined as shown in Equation 1. Details of the base sequences depending on the value of u can be found in 3GPP technical specification (TS) 36.211.

$$u=(f_{gh}(n_s)+f_{ss}) \bmod 30 \quad \text{[Equation 1]}$$

In addition, the above-described u value can be considered as the value of $f_{ss}$ when $f_{gh}(n_s)$ is 0. If the base sequences with the values of 20, 2, 12, and 0 are used in four DMRS symbols, the base sequence mapped to each DMRS symbol may be set to be different in each UE. In addition, each UE may select the value of u related to the base sequence for DMRS symbols in a random manner.

Meanwhile, in the current LTE system, the group hopping pattern $f_{gh}(n_s)$ can be defined as shown in Equation 2.

$$f_{gh}(n_s) = \begin{cases} 0 & \text{if group hopping is disabled} \\ \left(\sum_{i=0}^{7} c(8n_s+i)\cdot 2^i\right) \bmod 30 & \text{if grpoup hopping is enabled} \end{cases} \quad \text{[Equation 2]}$$

When a different base sequence is applied to each DMRS symbol as described above, $n_s$ can be replaced with a slot number for V2X communication in Equation 2. When two DMRSs are used in each slot as described above, group hopping shown in Equation 3 and Equation 4 below can be applied to the two DMRSs in a slot.

$$f_{gh}(n_s) = \begin{cases} 0 & \text{if group hopping is disabled} \\ \left(\sum_{i=0}^{7} c(8(2n_s)+i)\cdot 2^i\right) \bmod 4 & \text{if grpoup hopping is enabled} \end{cases} \quad \text{[Equation 3]}$$

$$f_{gh}(n_s) = \begin{cases} 0 & \text{if group hopping is disabled} \\ \left(\sum_{i=0}^{7} c(8(2n_s+1)+i)\cdot 2^i\right) \bmod 4 & \text{if grpoup hopping is enabled} \end{cases} \quad \text{[Equation 4]}$$

Equations 3 and 4 mean that $2 n_s$ and $2 n_s+1$ are applied to the DMRS base sequence in each slot. Since four base sequences are used as described above, modular 30 is modified as modular 4.

In Equations 3 and 4, c(i) indicates a pseudo random sequence and an initial value thereof can be defined as shown in Equation 5.

$$c_{init} = \left\lfloor \frac{n_{ID}^{RS}}{4} \right\rfloor \quad \text{[Equation 5]}$$

In Equation 5, $n^{RS}_{ID}$ indicates at least part of a transmitting UE's ID. In addition, unlike the initial value of the LTE system, the denominator is modified as 4 by considering the four DMRS base sequences.

In addition, in V2X communication, a group may be formed in each region. In this case, since there is geographical distance between individual groups, actual slot numbers may not be randomized. That is, randomization may be performed only on the four DMRS base sequences. In this case, different indices (e.g., 0, 1, 2, and 3) may be allocated to four DMRS symbols, and a base sequence of each DMRS symbol may be set as shown in Equation 6 instead of using the value of $n_s$.

$$f_{gli}(n_s) = \begin{cases} 0 & \text{if group hopping is disabled} \\ \left(\sum_{i=0}^{7} c(8n_d+i)\cdot 2^i\right) \bmod 30 & \text{if grpoup hopping is enabled} \end{cases} \quad \text{[Equation 6]}$$

In Equation 6 above, $n_d$ indicates a DMRS symbol index. In addition, 30 base sequences are considered in Equation 6. Moreover, when only the four base sequences are used as described above, Equation 1 may be modified as shown in Equation 7.

$$u=(f_{gh}(n_s)+f_{ss}) \bmod 4 \quad \text{[Equation 7]}$$

In addition, in V2X communication, information on priority of individual messages may be indicated by sidelink control information. In this case, a DMRS base sequence, cyclic shift, and/or OCC may be generated based on the priority. In addition, a DMRS sequence may be determined based on the priority. When the transmission frequency of a high priority message is greater than that of a low priority message, it is possible to reduce collisions between high priority messages.

Figure 20:
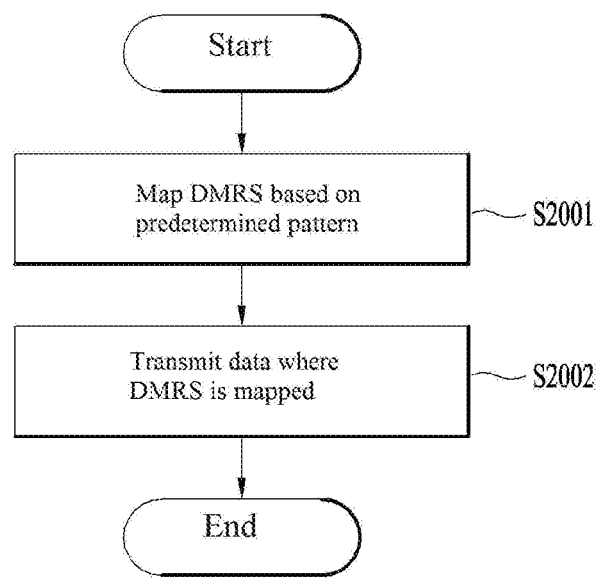
FIG. 20 is a flowchart illustrating a method for transmitting a reference signal according to an embodiment.

FIG. 20 is a flowchart illustrating a method for transmitting a reference signal according to an embodiment.

A transmitting end can perform DMRS mapping based on a predetermined pattern [S2001]. The predetermined pattern may include a first mapping rule and a second mapping rule.

The transmitting end may map a DMRS based on the first mapping rule in at least one subframe among a plurality of subframes. In addition, the transmitting end may map DMRS based on the second mapping different from the first mapping rule in the remaining subframes except the at least one subframe among the plurality of subframes.

The first mapping rule may be the first DMRS mapping in the above-described embodiments. That is, according to the first mapping rule, a DMRS may be mapped to four first symbols in one subframe, and the first symbols may include at least one symbol pair with an interval equal to or smaller than two symbols. In addition, according to the second mapping rule, a DMRS may be mapped to two second symbols in one subframe. For example, a DMRS may be mapped similar to the conventional LTE uplink DMRS. Moreover, according to the second mapping rule, a DMRS may be mapped to four second symbols in one subframe, and intervals between all second symbols may be greater than two symbols. That is, the second mapping rule may correspond to the above-described second DMRS mapping.

As described above, the first mapping rule may be applied to the first and last subframes among subframes for data transmission, and the second mapping rule may be applied to the remaining subframes. In addition, the first mapping rule may be applied to the center subframe among the subframes for data transmission, and the second mapping rule may be applied to the remaining subframes. Moreover, as described above, the first mapping rule and/or the second mapping rule may be applied to a subframe group. For example, the transmitted end may group subframes into groups including a predetermined number of subframes and then apply the first and second mapping rules to the individual groups. For example, the transmitting end may map a DMRS according to the first mapping rule in at least one subframe in each group. That is, the transmitting end may apply the first mapping rule to at least one subframe among a plurality of subframes. In addition, the plurality of subframes may be grouped into one group. In addition, a DMRS may be mapped in a comb-type manner. Further, as described above, when a periodic message is transmitted in a plurality of subframes, the first mapping rule may be applied to subframes corresponding to a multiple of period of the periodic message.

In addition, as described above, an OCC may be applied to the DMRS. A different OCC may be set in each DMRS symbol, or the same OCC may be set for all DMRSs in one subframe. Moreover, a different OCC may be set in each DMRS symbol group. In this case, the DMRS symbol group may be set based on an interval between DMRS symbols. Furthermore, whether the OCC is applied may be determined based on the interval between the DMRS symbols. For example, when an interval between two adjacent symbols is equal to or smaller than a predetermined interval, the OCC may be applied to the two adjacent symbols. Further, the OCC may be determined based on message priority.

Moreover, in the case of the DMRS according to the present invention, a base sequence may be determined according to the above-described embodiments.

Further, the transmitting end can transmit data where the DMRS is mapped [S2002]. The data where the DMRS is mapped may be transmitted in a plurality of subframes. In this case, the transmitting end may be a UE, a vehicle, a road side unit, and/or a base station.

Figure 21:
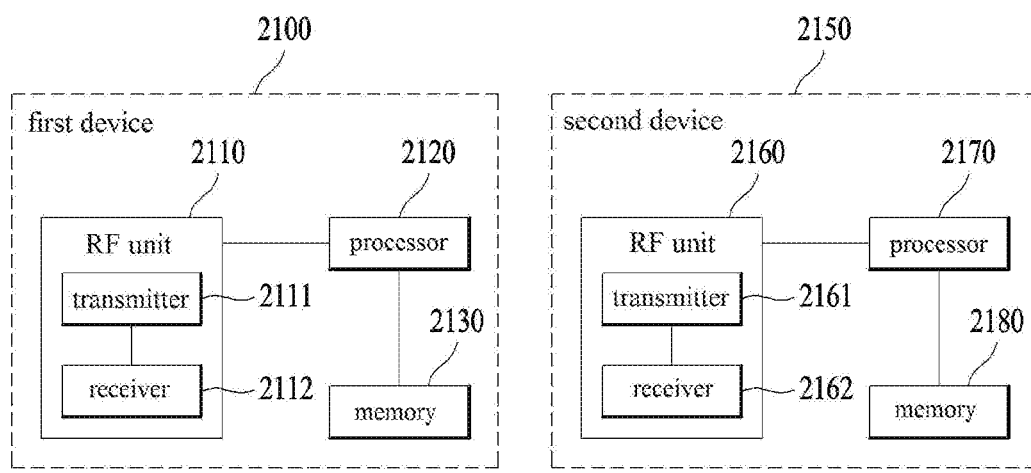
FIG. 21 is a schematic diagram illustrating devices according to an embodiment of the present invention.

FIG. 21 schematically illustrates configuration of devices to which the embodiments of the present invention illustrated in FIGS. 1 to 20 may be applied according to an embodiment of the present invention.

In FIG. 21, each of a first device 2100 and a second device 2150, which are D2D UEs, includes a radio frequency (RF) unit 2110, 2160, a processor 2120, 2170, and, optionally, a memory 2130, 2180. Although FIG. 21 shows configuration of two D2D UEs, a plurality of D2D UEs may establish a D2D communication environment.

Each of the RF unit 2130 and 2160 may include a transmitter 2111, 2161 and a receiver 2112, 2162. The transmitter 2111 and the receiver 2112 of the first device 2100 may be configured to transmit and receive signals to and from the second device 2150 and other D2D UEs, and the processor 2120 may be functionally connected to the transmitter 2111 and the receiver 2112 to control the transmitter 2111 and the receiver 2112 to transmit and receive signals to and from other devices. Meanwhile, the first device 2100 and/or the second device 2150 may be an eNB.

The processor 2120 may perform various kinds of processing on a signal to be transmitted, and then transmit the signal to the transmitter 2111, and process a signal received by the receiver 2112. If necessary, the processor 2120 may store, in the memory 2130, information contained in an exchanged message.

With the above-described structure, the first device 2000 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 21, the first device 2100 may include various additional elements according to device application type. For example, if the first device 2100 is for intelligent metering, the first device 2100 may include an additional element for power measurement and the like. The operation of power measurement may be under control of the processor 2120 or a separately configured processor (not shown).

For example, the second device 2150 may be an eNB. In this case, the transmitter 2161 and receiver 2162 of the eNB may be configured to transmit and receive signals to and from other eNBs, D2D servers, D2D devices, and the processor 2170 may be functionally connected to the transmitter 2161 and receiver 2162 and may be configured to control the process of the transmitter 2161 and the receiver 2162 transmitting and receiving signals to and from other devices. In addition, the processor 2170 may perform various kinds of processing on a signal to be transmitted, transmit the signal to the transmitter 2161, and process a signal received by the receiver 2162. If necessary, the processor 2170 may store, in the memory 2130, information contained in an exchanged message. With the above-described structure, the eNB 2150 may perform the methods of the various embodiments described above.

In FIG. 21, the processors 2120 and 2170 of the first device 2110 and the second device 2150 respectively instruct operations for the first device 2110 and the second device 2150 (for example, control, adjustment, management, etc.). Each of the processors 2120 and 2170 may be connected to the memory 2130, 2180 that stores program code and data. The memories 2130 and 2180 may be connected to the processors 2120 and 2170 to store operating systems, applications, and general files.

The processors 2120 and 2170 of the present invention may be referred to as a controller, a microcontroller, a microprocessor, a microcomputer, or the like. Meanwhile, the processors 2120 and 2170 may be implemented by hardware, firmware, software, or a combination thereof. When embodiments of the present invention are implemented using hardware, the processors 2120 and 2170 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The aforementioned embodiments of the present invention can be applied to various mobile communication systems.

What is claimed is:

1. A method for transmitting a message based on a demodulation reference signal (DMRS) by a user equipment (UE) in vehicle-to-something (V2X) communication, the method comprising:
mapping the DMRS in one or more subframes among a plurality of subframes, based on a first mapping rule;
mapping the DMRS in remaining subframes except the one or more subframes among the plurality of subframes, based on a second mapping rule different from the first mapping rule; and
transmitting the message in the plurality of subframes, based on the DMRS,
wherein the DMRS is mapped to four first symbols in one subframe based on the first mapping rule,
wherein the first symbols comprise at least one symbol pair with an interval equal to or less than two symbols,
wherein the one or more subframes in which the DMRS is mapped based on the first mapping rule are used for offset correction and, the remaining subframes in which the DMRS is mapped based on the second mapping rule are used for channel estimation, and
wherein an offset correction value is obtained from the one or more subframes in which the DMRS is mapped based on the first mapping rule and, the offset correction value is used for the plurality of subframes in transmission of the message.

2. The method of claim 1, wherein the DMRS is mapped to two second symbols in one subframe based on the second mapping rule.

3. The method of claim 1, wherein the DMRS is mapped to four second symbols in one subframe based on the second mapping rule, and
wherein an interval between second symbols is longer than two symbols.

4. The method of claim 1, wherein the plurality of subframes are continuous subframes, and
wherein a first subframe and a last subframe among the continuous subframes are used for mapping of the DMRS based on the first mapping rule.

5. The method of claim 1, wherein the plurality of subframes are continuous subframes, and
wherein a subframe located at a center among the continuous subframes is used for mapping of the DMRS based on the first mapping rule.

6. The method of claim 1, wherein the plurality of subframes are used to transmit a periodic message, and
wherein the one or more subframes comprises subframes related to multiples of a transmission period of the periodic message.

7. The method of claim 1, wherein an interval between two contiguous symbols among the four first symbols is equal to or shorter than a predetermined interval, an orthogonal cover code is used to the two contiguous symbols.

8. A user equipment (UE) for transmitting a message based on a demodulation reference signal (DMRS) in vehicle-to-something (V2X) communication, the UE comprising:
a transceiver; and
at least one processor configured to control the transceiver,
wherein the at least one processor is configured to:
map the DMRS in one or more subframes among a plurality of subframes, based on a first mapping rule;
map the DMRS in remaining subframes except the one or more subframes among the plurality of subframes, based on a second mapping rule different from the first mapping rule; and
transmit the message in the plurality of subframes, based on the DMRS,
wherein the DMRS is mapped to four first symbols in one subframe based on the first mapping rule,
wherein the first symbols comprise at least one symbol pair with an interval equal to or less than two symbols,
wherein the one or more subframes in which the DMRS is mapped based on the first mapping rule are used for offset correction and, the remaining subframes in which the DMRS is mapped based on the second mapping rule are used for channel estimation, and
wherein an offset correction value is obtained from the one or more subframes in which the DMRS is mapped based on the first mapping rule and, the offset correction value is used for the plurality of subframes in transmission of the message.

9. The UE of claim 8, wherein the DMRS is mapped to two second symbols in one subframe based on the second mapping rule.

10. The UE of claim 8, wherein the DMRS is mapped to four second symbols in one subframe based on the second mapping rule, and
wherein an interval between second symbols is longer than two symbols.

11. The UE of claim 8, wherein the DMRS is mapped to four second symbols in one subframe based on the second mapping rule, and
wherein an interval between two adjacent symbols among the second symbols is longer than two symbols.

12. The UE of claim 8, wherein the plurality of subframes are continuous subframes, and
wherein a first subframe and a last subframe among the continuous subframes are used for mapping of the DMRS based on the first mapping rule.

13. The UE of claim 8, wherein the plurality of subframes are used to transmit a periodic message, and
wherein the one or more subframes comprises subframes related to multiples of a transmission period of the periodic message.

14. The UE of claim 8, wherein an interval between two contiguous symbols among the four first symbols is equal to or shorter than a predetermined interval, an orthogonal cover code is used to the two contiguous symbols.

* * * * *